US011991239B2

(12) United States Patent
Thomas

(10) Patent No.: US 11,991,239 B2
(45) Date of Patent: *May 21, 2024

(54) SYSTEMS AND METHODS FOR AUTHORIZED, PROXIMAL DEVICE TO DEVICE COMMUNICATION WITHOUT PRIOR PAIRING WITHIN A CONTROLLED COMPUTING SYSTEM

(71) Applicant: Q Technologies, Inc., Brookhaven, GA (US)

(72) Inventor: Marcus Allen Thomas, Atlanta, GA (US)

(73) Assignee: Q Technologies, Inc., Brookhaven, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/882,557

(22) Filed: Aug. 6, 2022

(65) Prior Publication Data

US 2022/0407909 A1 Dec. 22, 2022

Related U.S. Application Data

(63) Continuation of application No. 16/713,717, filed on Dec. 13, 2019, now Pat. No. 11,445,007, which is a (Continued)

(51) Int. Cl.
*H04L 67/06* (2022.01)
*H04L 67/01* (2022.01)
(Continued)

(52) U.S. Cl.
CPC .............. *H04L 67/06* (2013.01); *H04L 67/01* (2022.05); *H04L 67/02* (2013.01); *H04L 67/10* (2013.01);
(Continued)

(58) Field of Classification Search
CPC .......... H04L 67/06; H04L 67/01; H04L 67/52
See application file for complete search history.

(56) References Cited

U.S. PATENT DOCUMENTS 3,609,752 A   9/1971  Grosser
3,910,322 A  10/1975  Hardesty, Jr. et al.
(Continued)

FOREIGN PATENT DOCUMENTS

CN      1712951 A   12/2005
CN    101377874 A    3/2009
(Continued)

OTHER PUBLICATIONS

International Search Report and Written Opinion dated May 12, 2015 for Application No. PCT/US2015/012701 in 10 pages.

(Continued)

*Primary Examiner* — Suraj M Joshi

(57) ABSTRACT

Systems and methods for location-based online content sharing using unique identifiers are provided. A server and a plurality of clients may be connected to one or more networks. A first client may send a shared content to the server. The first client may also send a first location of the first client as well as a unique identifier for the shared content. The server may store the shared content. A second client may request the shared content, and the request may include the unique identifier and a second location of the second client. The server may determine that the second location is within a predefined distance from the first location. Upon such determination, the server may send the shared content to the second client.

18 Claims, 5 Drawing Sheets

Related U.S. Application Data continuation of application No. 16/219,974, filed on Dec. 14, 2018, now Pat. No. 10,594,774, which is a continuation of application No. 15/494,451, filed on Apr. 22, 2017, now Pat. No. 10,567,473, which is a continuation of application No. 14/604,297, filed on Jan. 23, 2015, now Pat. No. 9,635,108.

(60) Provisional application No. 61/931,562, filed on Jan. 25, 2014.

(51) Int. Cl.
    *H04L 67/02*       (2022.01)
    *H04L 67/10*       (2022.01)
    *H04L 67/1095*     (2022.01)
    *H04L 67/52*       (2022.01)
    *H04L 67/55*       (2022.01)
    *H04W 4/80*        (2018.01)

(52) U.S. Cl.
    CPC .......... *H04L 67/1095* (2013.01); *H04L 67/52* (2022.05); *H04L 67/55* (2022.05); *H04W 4/80* (2018.02)

(56) References Cited

U.S. PATENT DOCUMENTS

| | | |
|---|---|---|
| 4,964,053 A | 10/1990 | Humble |
| 5,906,657 A | 5/1999 | Tognazzini |
| 5,965,861 A | 10/1999 | Addy et al. |
| 5,992,570 A | 11/1999 | Walter et al. |
| 6,011,819 A | 1/2000 | Shiro |
| 6,011,858 A | 1/2000 | Stock et al. |
| 6,018,768 A | 1/2000 | Ullman et al. |
| 6,276,332 B1 | 8/2001 | Storhok et al. |
| 6,681,989 B2 | 1/2004 | Bodiin |
| 6,947,922 B1 | 9/2005 | Glance |
| 6,954,735 B1 | 10/2005 | Djupsjöbacka et al. |
| 7,040,533 B1 | 5/2006 | Ramachandran |
| 7,044,370 B2 | 5/2006 | Bellis, Jr. et al. |
| 7,047,279 B1 | 5/2006 | Beams et al. |
| 7,190,949 B2 | 3/2007 | Tsuda et al. |
| 7,215,436 B2 | 5/2007 | Hull et al. |
| 7,263,659 B2 | 8/2007 | Hull et al. |
| 7,284,032 B2 | 10/2007 | Weber |
| 7,310,629 B1 | 12/2007 | Mendelson et al. |
| 7,343,351 B1 | 3/2008 | Bishop et al. |
| 7,373,173 B2 | 5/2008 | Brittan et al. |
| 7,379,921 B1 | 5/2008 | Kilicote |
| 7,392,938 B1 | 7/2008 | Ramachandran |
| 7,450,930 B2 | 11/2008 | Williams et al. |
| 7,483,858 B2 | 1/2009 | Foran et al. |
| 7,559,017 B2 | 7/2009 | Datar et al. |
| 7,580,699 B1 | 8/2009 | Shaw et al. |
| 7,672,871 B2 | 3/2010 | Brenhouse |
| 7,685,132 B2 | 3/2010 | Hyman |
| 7,786,999 B1 | 8/2010 | Reid |
| 7,796,984 B2 | 9/2010 | Hursey et al. |
| 7,802,310 B2 | 9/2010 | Farber et al. |
| 7,818,264 B2 | 10/2010 | Hammad |
| 7,849,135 B2 | 12/2010 | Agrawal et al. |
| 7,857,212 B1 | 12/2010 | Matthews |
| 7,873,573 B2 | 1/2011 | Realini |
| 7,912,827 B2 | 3/2011 | Byers et al. |
| 7,956,847 B2 | 6/2011 | Christie |
| 7,958,052 B2 | 6/2011 | Powell |
| 7,962,948 B1 | 6/2011 | Girouard et al. |
| 7,973,230 B2 | 7/2011 | Mahowald |
| 7,992,776 B1 | 8/2011 | Ramachandran et al. |
| 8,002,175 B2 | 8/2011 | Kuriyama et al. |
| 8,046,268 B2 | 10/2011 | Hunt |
| 8,046,411 B2 | 10/2011 | Hayashi et al. |
| 8,051,081 B2 | 11/2011 | Shahraray et al. |
| 8,065,185 B2 | 11/2011 | Foladare et al. |
| 8,103,584 B2 | 1/2012 | Bishop et al. |
| 8,112,702 B2 | 2/2012 | Badoiu et al. |
| 8,136,724 B1 | 3/2012 | Aidasani et al. |
| 8,184,797 B1 | 5/2012 | Rosen |
| 8,260,707 B2 | 9/2012 | Treadwell et al. |
| 8,296,229 B1 | 10/2012 | Yellin et al. |
| 8,332,323 B2 | 12/2012 | Stals et al. |
| 8,352,967 B2 | 1/2013 | Labour et al. |
| 8,353,052 B2 | 1/2013 | Larsson et al. |
| 8,364,591 B2 | 1/2013 | Rigby et al. |
| 8,379,098 B2 | 2/2013 | Rottler et al. |
| 8,380,177 B2 | 2/2013 | Laracey |
| 8,412,590 B2 | 4/2013 | Elliott |
| 8,413,182 B2 | 4/2013 | Bill |
| 8,413,884 B2 | 4/2013 | Lim et al. |
| 8,438,602 B2 | 5/2013 | Rao |
| 8,444,050 B2 | 5/2013 | Davila et al. |
| 8,452,660 B2 | 5/2013 | Morris |
| 8,494,908 B2 | 7/2013 | Herwig et al. |
| 8,571,937 B2 | 10/2013 | Rose et al. |
| 8,606,629 B2 | 12/2013 | Bous et al. |
| 8,608,570 B1 | 12/2013 | Mahajan et al. |
| 8,620,757 B2 | 12/2013 | Kramer et al. |
| 8,626,187 B2 | 1/2014 | Grosman et al. |
| 8,681,106 B2 | 3/2014 | Fleizach et al. |
| 8,862,978 B2 | 3/2014 | Evans |
| 8,705,933 B2 | 4/2014 | Eyer |
| 8,720,771 B2 | 5/2014 | MacKinnon et al. |
| 8,738,540 B2 | 5/2014 | Kobres |
| 8,776,193 B2 | 7/2014 | Li |
| 8,825,531 B1 | 9/2014 | Catoe |
| 8,838,961 B2 | 9/2014 | Zarfoss, III et al. |
| 8,875,309 B1 | 10/2014 | Diamond et al. |
| 8,950,667 B2 | 2/2015 | Seker |
| 8,972,496 B2 | 3/2015 | Bezos |
| 9,026,462 B2 | 5/2015 | Lin et al. |
| 9,026,905 B2 | 5/2015 | Tseng et al. |
| 9,049,567 B2 | 6/2015 | Le Guen et al. |
| 9,053,473 B2 | 6/2015 | Edwards |
| 9,053,475 B2 | 6/2015 | Kobres |
| 9,075,801 B2 | 7/2015 | Eggert |
| 9,077,693 B2 | 7/2015 | White et al. |
| 9,092,442 B2 | 7/2015 | Donabedian et al. |
| 9,092,776 B2 | 7/2015 | Dessert |
| 9,176,658 B1 | 11/2015 | Latin-Stoermer et al. |
| 9,218,530 B2 | 12/2015 | Davis et al. |
| 9,240,058 B1 | 1/2016 | Amacker et al. |
| 9,245,267 B2 | 1/2016 | Singh |
| 9,288,254 B2 | 3/2016 | Sharkey |
| 9,292,870 B2 | 3/2016 | Langley et al. |
| 9,305,295 B2 | 4/2016 | Laracey |
| 9,378,386 B1 | 6/2016 | Saylor et al. |
| 9,390,169 B2 | 7/2016 | Mouilleseaux et al. |
| 9,490,998 B1 | 11/2016 | Danciu et al. |
| 9,565,175 B1 | 2/2017 | Saylor et al. |
| 9,635,108 B2 | 4/2017 | Thomas |
| 9,692,812 B1 | 6/2017 | Ho et al. |
| 9,721,282 B2 | 8/2017 | Hitchcock et al. |
| 9,846,863 B2 | 12/2017 | Grossi et al. |
| 9,922,370 B2 | 3/2018 | Kobres et al. |
| 9,933,937 B2 | 4/2018 | Lemay et al. |
| 9,940,616 B1 | 4/2018 | Morgan et al. |
| 9,996,825 B1 | 6/2018 | Casey et al. |
| 10,007,900 B2 | 6/2018 | Royyuru et al. |
| 10,027,723 B2 | 7/2018 | Keskitalo et al. |
| 10,068,271 B1 | 9/2018 | Ben-Amotz |
| 10,108,939 B1 | 10/2018 | Ritter et al. |
| 10,127,588 B2 | 11/2018 | Longino |
| 10,169,960 B2 | 1/2019 | Inderrieden et al. |
| 10,223,691 B2 | 3/2019 | Katzin et al. |
| 10,313,401 B2 | 6/2019 | Zhang et al. |
| 10,319,174 B2 | 6/2019 | Miller et al. |
| 10,339,519 B2 | 7/2019 | Black |
| 10,438,194 B2 | 10/2019 | Nybom |
| 10,535,049 B2 | 1/2020 | Leger et al. |
| 10,567,473 B2 | 2/2020 | Thomas |
| 10,594,774 B2 | 3/2020 | Thomas |
| 10,638,261 B2 | 4/2020 | Kannan |
| 11,172,363 B2 | 11/2021 | Kobres |

(56) References Cited

U.S. PATENT DOCUMENTS

| | | |
|---|---|---|
| 2002/0003535 A1 | 1/2002 | Cho |
| 2002/0023027 A1 | 2/2002 | Simonds |
| 2002/0077937 A1 | 6/2002 | Lyons et al. |
| 2002/0147771 A1 | 10/2002 | Traversat et al. |
| 2002/0165793 A1 | 11/2002 | Brand et al. |
| 2002/0184304 A1 | 12/2002 | Meade, II et al. |
| 2003/0004808 A1 | 1/2003 | Elhaoussine et al. |
| 2003/0046238 A1 | 3/2003 | Nonaka et al. |
| 2003/0050959 A1 | 3/2003 | Faybishenko et al. |
| 2003/0078973 A1 | 4/2003 | Przekop et al. |
| 2003/0104785 A1 | 6/2003 | Iwanaga |
| 2003/0107575 A1 | 6/2003 | Cardno |
| 2003/0110136 A1 | 6/2003 | Wells et al. |
| 2003/0130958 A1 | 7/2003 | Narayanam et al. |
| 2003/0131002 A1 | 7/2003 | Gennetten et al. |
| 2003/0182327 A1 | 9/2003 | Ramanujam et al. |
| 2003/0200152 A1 | 10/2003 | Divekar |
| 2004/0030930 A1 | 2/2004 | Nomura |
| 2004/0064406 A1 | 4/2004 | Yates et al. |
| 2004/0107439 A1 | 6/2004 | Hassell et al. |
| 2004/0186594 A1 | 9/2004 | Kondo et al. |
| 2004/0257196 A1 | 12/2004 | Kotzin |
| 2004/0266338 A1 | 12/2004 | Rowitch |
| 2005/0027543 A1 | 2/2005 | Labrou et al. |
| 2005/0086211 A1 | 4/2005 | Mayer |
| 2005/0091316 A1 | 4/2005 | Ponce et al. |
| 2005/0108299 A1 | 5/2005 | Nakajima |
| 2005/0114672 A1 | 5/2005 | Duncan et al. |
| 2005/0129068 A1 | 6/2005 | Ginzburg et al. |
| 2005/0131826 A1 | 6/2005 | Cook |
| 2005/0138576 A1 | 6/2005 | Baumert et al. |
| 2005/0160113 A1 | 7/2005 | Sipusic et al. |
| 2005/0197968 A1 | 9/2005 | Das et al. |
| 2005/0199699 A1 | 9/2005 | Sato et al. |
| 2005/0203854 A1 | 9/2005 | Das et al. |
| 2005/0211771 A1 | 9/2005 | Onozu |
| 2005/0219068 A1 | 10/2005 | Jones et al. |
| 2005/0267806 A1 | 12/2005 | Tano |
| 2005/0271057 A1 | 12/2005 | Kim et al. |
| 2005/0273399 A1 | 12/2005 | Soma et al. |
| 2006/0040692 A1 | 2/2006 | Anttila et al. |
| 2006/0041632 A1 | 2/2006 | Shah et al. |
| 2006/0043175 A1 | 3/2006 | Fu et al. |
| 2006/0062298 A1 | 3/2006 | Park et al. |
| 2006/0085477 A1 | 4/2006 | Phillips et al. |
| 2006/0105742 A1 | 5/2006 | Kim et al. |
| 2006/0136379 A1 | 6/2006 | Marino et al. |
| 2006/0203758 A1 | 9/2006 | Tee et al. |
| 2006/0251339 A1 | 11/2006 | Gokturk et al. |
| 2006/0277196 A1 | 12/2006 | Oosawa et al. |
| 2007/0022158 A1 | 1/2007 | Vasa et al. |
| 2007/0060334 A1 | 3/2007 | Rowe |
| 2007/0108269 A1 | 5/2007 | Benco et al. |
| 2007/0118794 A1 | 5/2007 | Hollander et al. |
| 2007/0198432 A1 | 8/2007 | Pitroda et al. |
| 2007/0203736 A1 | 8/2007 | Ashton |
| 2007/0220597 A1 | 9/2007 | Ishida |
| 2007/0226174 A1 | 9/2007 | Saito |
| 2007/0228163 A1 | 10/2007 | Schon et al. |
| 2007/0245223 A1 | 10/2007 | Siedzik et al. |
| 2007/0253603 A1 | 11/2007 | Kimura et al. |
| 2007/0255653 A1 | 11/2007 | Tumminaro et al. |
| 2007/0255785 A1 | 11/2007 | Hayashi et al. |
| 2007/0288164 A1 | 12/2007 | Gordon et al. |
| 2008/0040285 A1 | 2/2008 | Wankmueller |
| 2008/0085682 A1 | 4/2008 | Rao |
| 2008/0091616 A1 | 4/2008 | Helwing et al. |
| 2008/0092168 A1 | 4/2008 | Logan et al. |
| 2008/0119705 A1 | 5/2008 | Patel et al. |
| 2008/0133351 A1 | 6/2008 | White et al. |
| 2008/0134054 A1 | 6/2008 | Clark et al. |
| 2008/0154903 A1 | 6/2008 | Crowley et al. |
| 2008/0157970 A1 | 7/2008 | Single et al. |
| 2008/0184121 A1 | 7/2008 | Kulas |
| 2008/0200154 A1 | 8/2008 | Maharajh et al. |
| 2008/0235108 A1 | 9/2008 | Kulakowski et al. |
| 2008/0243702 A1 | 10/2008 | Hart et al. |
| 2008/0244676 A1 | 10/2008 | DaCosta |
| 2008/0245871 A1 | 10/2008 | Sato et al. |
| 2008/0288377 A1 | 11/2008 | Koukis |
| 2008/0290987 A1 | 11/2008 | Li |
| 2008/0302867 A1 | 12/2008 | Holberg |
| 2008/0302872 A1 | 12/2008 | Tate |
| 2008/0306835 A1 | 12/2008 | Agura et al. |
| 2009/0006256 A1 | 1/2009 | Lazovsky et al. |
| 2009/0057393 A1 | 3/2009 | Merkow et al. |
| 2009/0076875 A1 | 3/2009 | Lert, Jr. et al. |
| 2009/0084840 A1 | 4/2009 | Williams et al. |
| 2009/0094520 A1 | 4/2009 | Kulas |
| 2009/0111378 A1 | 4/2009 | Sheynman et al. |
| 2009/0117883 A1 | 5/2009 | Coffing et al. |
| 2009/0157560 A1 | 6/2009 | Carter et al. |
| 2009/0167493 A1 | 7/2009 | Colciago |
| 2009/0171905 A1 | 7/2009 | Garcia |
| 2009/0172150 A1 | 7/2009 | Alkov et al. |
| 2009/0201896 A1 | 8/2009 | Davis et al. |
| 2009/0233582 A1 | 9/2009 | Suzuki et al. |
| 2009/0252383 A1 | 10/2009 | Adam et al. |
| 2009/0254479 A1 | 10/2009 | Pharris |
| 2009/0254978 A1 | 10/2009 | Rouskov et al. |
| 2009/0281904 A1 | 11/2009 | Pharris |
| 2009/0282124 A1 | 11/2009 | Rauhala et al. |
| 2009/0315687 A1 | 12/2009 | Kanevsky et al. |
| 2010/0002122 A1 | 1/2010 | Larson et al. |
| 2010/0005485 A1 | 1/2010 | Tian et al. |
| 2010/0078475 A1 | 4/2010 | Lin et al. |
| 2010/0082485 A1 | 4/2010 | Lin et al. |
| 2010/0082489 A1 | 4/2010 | Lin et al. |
| 2010/0104238 A1 | 4/2010 | Vadivelu |
| 2010/0125509 A1 | 5/2010 | Kranzley et al. |
| 2010/0133335 A1 | 6/2010 | Maguid et al. |
| 2010/0138344 A1 | 6/2010 | Wong et al. |
| 2010/0146051 A1 | 6/2010 | Agrawal et al. |
| 2010/0169786 A1 | 7/2010 | O'Brien et al. |
| 2010/0177696 A1 | 7/2010 | Jung et al. |
| 2010/0185544 A1 | 7/2010 | Adiseshann |
| 2010/0191626 A1 | 7/2010 | Nonaka |
| 2010/0211452 A1 | 8/2010 | D'Angelo et al. |
| 2010/0216429 A1 | 8/2010 | Mahajan |
| 2010/0225808 A1 | 9/2010 | Mears |
| 2010/0251120 A1 | 9/2010 | Chelba |
| 2010/0268779 A1 | 10/2010 | Rao |
| 2010/0290443 A1 | 11/2010 | Gabel |
| 2010/0299522 A1 | 11/2010 | Khambete |
| 2011/0023096 A1 | 1/2011 | Xiao et al. |
| 2011/0047163 A1 | 2/2011 | Chechik et al. |
| 2011/0047237 A1 | 2/2011 | Walsh et al. |
| 2011/0055547 A1 | 3/2011 | Lee et al. |
| 2011/0106954 A1 | 5/2011 | Chatterjee et al. |
| 2011/0107369 A1 | 5/2011 | O'Brien et al. |
| 2011/0125561 A1 | 5/2011 | Marcus |
| 2011/0131130 A1 | 6/2011 | Griffin et al. |
| 2011/0131419 A1 | 6/2011 | Dowds et al. |
| 2011/0145051 A1 | 6/2011 | Paradise et al. |
| 2011/0218996 A1 | 9/2011 | Jin et al. |
| 2011/0225421 A1 | 9/2011 | Han et al. |
| 2011/0246502 A1 | 10/2011 | Aguera y Areas et al. |
| 2011/0251892 A1 | 10/2011 | Laracey |
| 2011/0258556 A1 | 10/2011 | Kiciman et al. |
| 2011/0270751 A1 | 11/2011 | Csinger et al. |
| 2011/0279638 A1 | 11/2011 | Periyannan et al. |
| 2011/0295502 A1 | 12/2011 | Faenger |
| 2011/0302089 A1 | 12/2011 | McKenzie |
| 2011/0307318 A1 | 12/2011 | LaPorte et al. |
| 2011/0307599 A1 | 12/2011 | Saretto et al. |
| 2011/0319016 A1 | 12/2011 | Gormley et al. |
| 2012/0058721 A1 | 3/2012 | Fok et al. |
| 2012/0110429 A1 | 5/2012 | Tzonis et al. |
| 2012/0130889 A1 | 5/2012 | Lyons et al. |
| 2012/0136739 A1 | 5/2012 | Chung |
| 2012/0168493 A1 | 7/2012 | Worms |
| 2012/0173351 A1 | 7/2012 | Hanson et al. |
| 2012/0197793 A1 | 8/2012 | Grigg et al. |
| 2012/0197794 A1 | 8/2012 | Grigg et al. |

(56) References Cited

U.S. PATENT DOCUMENTS

| | | | |
|---|---|---|---|
| 2012/0199647 A1 | 8/2012 | Hwang et al. | |
| 2012/0203695 A1 | 8/2012 | Morgan et al. | |
| 2012/0209749 A1 | 8/2012 | Hammad et al. | |
| 2012/0284130 A1 | 11/2012 | Lewis et al. | |
| 2012/0290480 A1 | 11/2012 | Chen | |
| 2012/0290648 A1 | 11/2012 | Sharkey | |
| 2012/0297466 A1 | 11/2012 | Li | |
| 2012/0324544 A1 | 12/2012 | Kanetomo | |
| 2013/0018960 A1 | 1/2013 | Knysz et al. | |
| 2013/0043302 A1 | 2/2013 | Powlen et al. | |
| 2013/0046833 A1 | 2/2013 | Riepling et al. | |
| 2013/0054697 A1 | 2/2013 | Cha | |
| 2013/0091558 A1 | 4/2013 | Kim et al. | |
| 2013/0110676 A1 | 5/2013 | Kobres | |
| 2013/0110678 A1 | 5/2013 | Vigier et al. | |
| 2013/0151593 A1 | 6/2013 | Shin et al. | |
| 2013/0173403 A1 | 7/2013 | Grigg et al. | |
| 2013/0225080 A1 | 8/2013 | Doss et al. | |
| 2013/0254114 A1 | 9/2013 | Smith | |
| 2013/0305287 A1 | 11/2013 | Wong et al. | |
| 2013/0333055 A1* | 12/2013 | Pallakoff | H04L 63/10 726/29 |
| 2013/0334300 A1 | 12/2013 | Evans | |
| 2014/0007189 A1 | 1/2014 | Huynh et al. | |
| 2014/0020059 A1 | 1/2014 | Miyamoto et al. | |
| 2014/0033286 A1* | 1/2014 | Zhang | H04W 12/06 726/7 |
| 2014/0067825 A1 | 3/2014 | Oztaskent et al. | |
| 2014/0172531 A1 | 6/2014 | Liberty et al. | |
| 2014/0197234 A1 | 7/2014 | Hammad | |
| 2014/0203071 A1* | 7/2014 | Eggert | H04L 67/104 235/375 |
| 2014/0245349 A1 | 8/2014 | Kim et al. | |
| 2014/0337138 A1 | 11/2014 | Chitalia et al. | |
| 2015/0026275 A1 | 1/2015 | Zhang | |
| 2015/0052615 A1 | 2/2015 | Gault et al. | |
| 2015/0113054 A1 | 4/2015 | Li | |
| 2015/0215770 A1 | 7/2015 | Chan et al. | |
| 2016/0044122 A1 | 2/2016 | Sandholm et al. | |

FOREIGN PATENT DOCUMENTS

| | | |
|---|---|---|
| CN | 101377875 A | 3/2009 |
| CN | 102833345 A | 12/2012 |
| EP | 1130933 B1 | 10/2009 |
| JP | H 11119974 A | 4/1999 |
| JP | 2002032686 A | 1/2002 |
| JP | 2002109421 A | 4/2002 |
| JP | 2002132616 A | 5/2002 |
| JP | 2003008769 A | 1/2003 |
| JP | 2003141402 A | 5/2003 |
| JP | 2004164377 A | 6/2004 |
| JP | 2004246536 A | 9/2004 |
| JP | 2004326348 A | 11/2004 |
| JP | 2005084723 A | 3/2005 |
| JP | 3743759 B2 | 2/2006 |
| JP | 2006099713 A | 4/2006 |
| JP | 2006133841 A | 5/2006 |
| JP | 2006268302 A | 10/2006 |
| JP | 2007034941 A | 2/2007 |
| JP | 2007058405 A | 3/2007 |
| JP | 2007074176 A | 3/2007 |
| JP | 2007121626 A | 5/2007 |
| JP | 2007164273 A | 6/2007 |
| JP | 2007328549 A | 12/2007 |
| JP | 2008065659 A | 3/2008 |
| JP | 2008129635 A | 6/2008 |
| JP | 2008129787 A | 6/2008 |
| JP | 2008197746 A | 8/2008 |
| JP | 2008217277 A | 9/2008 |
| JP | 4304162 B2 | 7/2009 |
| JP | 4519450 B2 | 8/2010 |
| JP | 4996085 B2 | 8/2012 |
| JP | 5098357 B2 | 12/2012 |
| KR | 20060084520 A | 7/2006 |
| KR | 20070021608 A | 2/2007 |
| KR | 20080032555 A | 4/2008 |
| KR | 1020130037434 A | 4/2013 |
| NL | 8800907 A | 11/1989 |
| WO | WO 2007/129581 A1 | 11/2007 |
| WO | WO 2014/051577 A1 | 4/2014 |

OTHER PUBLICATIONS

Defendant Neutron Holdings, Inc. d/b/a LIME's Final Invalidity Contentions filed Jul. 1, 20222in U.S. District Court, Western District of Texas, Case #6:21-cv-00321-ADA (125 pages).

Defendant Walmart, Inc.'s Final Invalidity Contentions filed Jul. 1, 20222 in U.S. District Court, Western District of Texas, Case #6:21-cv-00779-ADA (123 pages).

Addictive Tips, "qrSEND Lets You Scan QR Codes To Transfer Files From Windows, Mac & Linux To Android", available at https://www.addictivetips.com/windows-tips/scan-qrcodes-to-transfer-files-from-windows-mac-linux-toandroid/, Apr. 30, 2013.

Alvarez et al., "Paydiant, Harvard Business School", May 13, 2011.

Droidla, "Encode Any Image as a QR Code!", available at https://web.archive.org/web/20120627011811/http://qrdroid.com/blog/encode-any-image-as-a-qr-code.html.

Eirik Rye, "qrSend 0.8", available at www.windows10download.com/qrsend, May 1, 2013.

Finovate TV, "FIS demoed at FinovateSpring in 2013." 2013, 1 page.

McAkins Online, Send To QR Code—Data Sharing Between Mobile Devices, available at https://mcakins.com/2012/10/25/send-to-qr-code-datasharing-between-mobile-devices/.

MMTMag, "Chris Gardner speaks about Paydiant's white label Mobile Wallet", Oct. 28, 2013, 1 page.

Sack et al., "Integrating Social Tagging and Document Annotation for Content-Based Search in Multimedia Data" in Semantic Authoring and Annotation Workshop (SAAW), 2006. Athens, Georgia.

Paydiant Inc., "Paydiant Mobile Wallet", Jul. 15, 2013.

Paydiant Inc., Paydiant, Inc. Home Page, available at https://web.archive.org/web/20130105013011/http://www.paydiant.com/, Jan. 5, 2013.

Paydiant Inc., "Banks Detail—Paydiant, Inc.,", available at https://web.archive.org/web/20130224005243/http://www.paydiant.com/banks/banks-detail.html, Feb. 24, 2013.

Paydiant Inc., "Solution Overview—Paydiant, Inc.", available at https://web.archive.org/web/20130224005236/http://www.paydiant.com/solution/solution-overview.html, Feb. 24, 2013.

Paydiant Inc., "Technology—Paydiant, Inc.", available at https://web.archive.org/web/20130224005211/http://www.paydiant.com/solution/technology.html, Feb. 24, 2013.

Paydiant Inc., "Security—Paydiant, Inc.", available at https://web.archive.org/web/20130224005150/http://www.paydiant.com/solution/security.html, Feb. 24, 2013.

Paydiant Inc., "Paydiant Background—Paydiant, Inc.", available at https://web.archive.org/web/20130224005154/http://www.paydiant.com/about/paydiant-background.html, Feb. 24, 2013.

PcAMERICA, "Moxie Boutique Signs on for BPAY to Attract New Customers Increase Repeat Business", Aug. 22, 2013, 1 page.

PcAMERICA, "Payment Processing, available at https://web.archive.org/web/20120712004355/http://faq.pcamerica.com:80/paymentprocessing", Jul. 12, 2012.

PcAMERICA, "Paydiant Processing Config", Nov. 27, 2015.

Samsung, "How to Activate a Netflix Account.mp4", Sep. 16, 2011, 1 page. Available at https://www.youtube.com/watch?v=ayknA7PhWgc.

Wikipedia, Certificate Authority, Wikipedia, available at https://en.wikipedia.org/w/index.php?title=Certificate_authority&oldid=506379072.

Wikipedia, Certificate Signing Request, Wikipedia, available at https://en.wikipedia.org/w/index.php?title=Certificate_signing_request&oldid=508329725.

Wikipedia, Cryptographic Hash Function, Wikipedia, available at https://en.wikipedia.org/w/index.php?title=Cryptographic_hash_function&oldid=506426545.

(56) References Cited

OTHER PUBLICATIONS

Wikipedia, Digital Signature, Wikipedia, available at https://en.wikipedia.org/w/index.php?title=Digital_signature&oldid=507425864.
Wikipedia, Identity-Based Encryption, Wikipedia, available at https://en.wikipedia.org/w/index.php?title=Identitybased_encryption&oldid=504505054.
Wikipedia, Message authentication code, Wikipedia, available at https://en.wikipedia.org/w/index.php?title=Message_authentication_code&oldid=493886624.
Wikipedia, Multi-factor authentication, Wikipedia, available at https://en.wikipedia.org/w/index.php?title=Multifactor_authentication&oldid=506131320.
*Q Technologies, Inc.* v. *Neutron Holdings, Inc.'s* Docket Sheet downloaded Jun. 22, 2022 in U.S. District Court, Western District of Texas, Case #6:21-cv-00321-ADA, Patent Infringement; (7 pages).
*Q Technologies, Inc.* v. *Walmart Inc.'s* Docket Sheet downloaded Jun. 22, 2022 in U.S. District Court, Western District of Texas, Case #6:21-cv-00779-ADA, Patent Infringement; (7 pages).
Complaint filed by *Q Technologies, Inc.* v. *Neutron Holdings, Inc. D/B/A LIME* on Apr. 1, 2021 in U.S. District Court, Western District of Texas, Case #6:21-cv-00321-ADA, Infringement Action involving U.S. Pat. No. 9,635,108; 10,567,473, and 10,594,774 (85 pages).
Complaint filed by *Q Technologies, Inc.* v. *Walmart Inc.* on Jul. 29, 2021 in U.S. District Court, Western District of Texas, Case #6:21-cv-00779-ADA, Infringement Action involving U.S. Pat. No. 9,635,108; 10,567,473, and 10,594,774 (72 pages).
Defendant Neutron Holdings, Inc. D/B/ALIME's Answer And Affirmative Defenses to Complaint filed on Aug. 30, 2021 in U.S. District Court, Western District of Texas, Case #6:21-cv-00321-ADA (17 pages).
Defendant Walmart Inc.'s Answer And Counterclaims to Complaint filed on Oct. 4, 2021 in U.S. District Court, Western District of Texas, Case #6:21-cv-00779-ADA (34 pages).
Q Technologies, Inc.'s Answer to Walmart, Inc.'s Counterclaims filed on Oct. 22, 2021 in U.S. District Court, Western District of Texas, Case #6:21-cv-00779-ADA (10 pages).
Defendants' Neutron Holdings, Inc. d/b/a LIME's and Walmart, Inc.'s Preliminary Invalidity Contentions filed Dec. 23, 2021 in U.S. District Court, Western District of Texas, Case #6:21-cv-0321-ADA and #6:21-cv-00779-ADA (119 pages).
Defendants' Neutron Holdings, Inc. d/b/a LIME's and Walmart, Inc.'s Opening Claim Construction Brief filed Feb. 11, 2022 in U.S. District Court, Western District of Texas, Case #6:21-cv-0321-ADA and #6:21-cv-00779-ADA (301 pages).
Q Technologies, Inc.'s Responsive Claim Construction Brief filed Mar. 4, 2022 in U.S. District Court, Western District of Texas, Case #6:21-cv-0321-ADA and #6:21-cv-00779-ADA (257 pages).
Defendants' Walmart, Inc.'s and Neutron Holdings, Inc. d/b/a LIME's Reply Claim Construction Brief filed Mar. 15, 2022 in U.S. District Court, Western District of Texas, Case #6:21-cv-0321-ADA and #6:21-cv-00779-ADA (62 pages).
Q Technologies, Inc.'s Sur-Reply Claim Construction Brief filed Mar. 24, 2022 in U.S. District Court, Western District of Texas, Case #6:21-cv-0321-ADA and #6:21-cv-00779-ADA (19 pages).
Defendants' Neutron Holdings, Inc. d/b/a LIME's and Walmart, Inc.'s Joint Claim Construction Statement filed Mar. 29, 2022 in U.S. District Court, Western District of Texas, Case #6:21-cv-0321-ADA and #6:21-cv-00779-ADA (6 pages).
Court's Claim Construction Order issued May 24, 2022 in U.S. District Court, Western District of Texas, Case #6:21-cv-0321-ADA and #6:21-cv-00779-ADA (4 pages).
Court's Memorandum Opinion and Order Granting 117 Sealed Motion Defendant Walmart Inc.'s Motion for Summary Judgment of Patent Ineligibility Pursuant to 35 U.S.C. Section 101 issued Mar. 6, 2024 in U.S. District Court, Western District of Texas, Case #6:21-cv-00779-ADA (13 pages).
Walmart Inc Response to Motion, re181 Motion for Leave to File Expert Witness Deposition Testimony filed by Plaintiff Q Technologies, Inc. Walmart Inc.'s Statement of Non-Opposition in Response to Plaintiff Q Technologies, Inc.'s Motion for Leave to Supplement the Record, issued Jan. 26, 2024 in U.S. District Court, Western District of Texas, Case #6:21-cv-00779-ADA (38 pages).
Walmart Inc, Notice Pursuant to 35 U.S.C. § 282 by Walmart, Inc . . . issued Jan. 26, 2024 in U.S. District Court, Western District of Texas, Case #6:21-cv-00779-ADA (21 pages).
Qtechnologies/Walmart Inc, Notice (Joint) Identifying Remaining Objections to Pretrial Disclosures and Disputes on Motions in Limine by Q Technologies, Inc.issued Jan. 17, 2024 in U.S. District Court, Western District of Texas, Case #6:21-cv-00779-ADA (163 pages).
Q Technologies Inc . . . Motion for Leave to File Expert Witness Deposition Testimony issued Jan. 12, 2024 in U.S. District Court, Western District of Texas, Case #6:21-cv-00779-ADA (3 pages).
Walmart Inc, Notice Joint Notice Regarding Supplemental Expert Discovery by Walmart, Inc issued Jan. 10, 2024 in U.S. District Court, Western District of Texas, Case #6:21-cv-00779-ADA (4 pages).
Walmart Inc., Miscellaneous Objection to159 Pretrial Disclosures, Defendant Walmart Inc.'s Objections to Q Technologies, Inc.'s Aug. 7, 2023 Witness List by Walmart, Inc . . . issued Aug. 14, 2023 in U.S. District Court, Western District of Texas, Case #6:21-cv-00779-ADA (4 pages).
Walmart Inc, Redacted Copy [Public Version] Defendant Walmart Inc.'s Opposition to Plaintiff Q Technologies, Inc.'s Motions in Limine of158 Sealed Document, by Walmart, Inc issued Aug. 14, 2023 in U.S. District Court, Western District of Texas, Case #6:21-cv-00779-ADA (18 pages).
Q Technologies Inc, Miscellaneous Objection to159 Pretrial Disclosures, [Objections to Walmart, Inc.'s Aug. 7, 2023 Proposed Jury Instructions] by Q Technologies, Inc. issued Aug. 14, 2023 in U.S. District Court, Western District of Texas, Case #6:21-cv-00779-ADA (8 pages).
Q Technologies Inc, Miscellaneous Objection to159 Pretrial Disclosures, [Objections to Walmart, Inc.'s Aug. 7, 2023 First Amended Trial Witness List] by Q Technologies, Inc. issued Aug. 14, 2023 in U.S. District Court, Western District of Texas, Case #6:21-cv-00779-ADA (4 pages).
Q Technologies Inc, Redacted Copy [Public Version] of157 Sealed Document: Response to Defendant's Motions in Limine of152 Sealed Motion Defendant Walmart Inc.'s Motions in Limine, by Q Technologies, Inc. issued Aug. 14, 2023 in U.S. District Court, Western District of Texas, Case #6:21-cv-00779-ADA (5 pages).
Q Technologies/Walmart, Pretrial Disclosures Proposed Joint Pretrial Order by Q Technologies, Inc. issued Aug. 7, 2023 in U.S. District Court, Western District of Texas, Case #6:21-cv-00779-ADA (507 pages).
Walmart Inc, Redacted Copy [Public Version] of152 Sealed Motion Defendant Walmart Inc.'s Motions in Limine by Walmart, Inc. by Walmart, Inc. issued Jul. 31, 2023 in U.S. District Court, Western District of Texas, Case #6:21-cv-00779-ADA (5 pages).
Q Technolgies, Inc, Redacted Copy [Public Version] of150 Sealed Motion—Plaintiff Q Technologies, Inc.'s Motions in Limine by Q Technologies, Inc. by Q Technologies, Inc. issued Jul. 31, 2023 in U.S. District Court, Western District of Texas, Case #6:21-cv-00779-ADA (11 pages).
Q Technologies, Inc. Redacted Public Version of135 Sealed Document: Plaintiff's Reply in Support of its Motion for Summary Judgment of108 Sealed Motion Plaintiff's Motion for Summary Judgment by Q Technologies, Inc. issued Jul. 19, 2023 in U.S. District Court, Western District of Texas, Case #6:21-cv-00779-ADA (13 pages).
Walmart Inc. Redacted Copy [Public Version] Defendant Walmart Inc.'s Reply in Support of Its Motion to Exclude Certain of the Damages Apportionment Opinions of Stephen A. Holzen and Michael Brogioli Under Fed. R. Evid. 702 and Daubert of140 Sealed Document, by Walmart, Inc. issued Jul. 19, 2023 in U.S. District Court, Western District of Texas, Case #6:21-cv-00779-ADA (15 pages).
Walmart Inc Redacted Copy [Public Version] Defendant Walmart Inc.'s Reply in Support of Its Motion to Exclude Certain Opinions Identified in Dr. Michael Brogioli and Dr. Robert Akl's Expert

(56) References Cited

OTHER PUBLICATIONS

Reports of141 Sealed Document, by Walmart, Inc.issued Jul. 19, 2023 in U.S. District Court, Western District of Texas, Case #6:21-cv-00779-ADA (428 pages).
Walmart Inc. Redacted Copy [Public Version] Defendant Walmart Inc.'s Reply in Support of Its Motion for Summary Judgment of Patent Ineligibility Pursuant to 35 U.S.C. Section 101 of143 Sealed Document, by Walmart, Inc. issued Jul. 12, 2023 in U.S. District Court, Western District of Texas, Case #6:21-cv-00779-ADA (78 pages).
Q Technologies Inc, Redacted Copy [Public Version] Plaintiff's Response to Defendant's Motion to Exclude the Damages Apportionment Opinions of Stephen A. Holzen and Michael Brogioli Under Fed. R. Evid. 702 and Daubert of127 Sealed Document,, by Q Technologies, Inc, issued Jul. 12, 2023 in U.S. District Court, Western District of Texas, Case #6:21-cv-00779-ADA (19 pages).
Q Technologies Inc, Redacted Copy [Public Version] Plaintiff's Response to Defendant's Motion to Exclude Certain Opinions Identified in Dr. Brogioli's and Dr. Akl's Expert Reports of129 Sealed Document,, by Q Technologies, Inc, issued Jul. 12, 2023 in U.S. District Court, Western District of Texas, Case #6:21-cv-00779-ADA (38 pages).
Q Technologies Inc, Redacted Copy [Public Version] Plaintiff's Response to Defendant's Motion for Summary Judgment of Patent Ineligibility of125 Sealed Document, by Q Technologies, Inc., issued Jul. 12, 2023 in U.S. District Court, Western District of Texas, Case #6:21-cv-00779-ADA (160 pages).
Walmart Inc. Redacted Copy Defendant Walmart Inc.'s Opposition to Plaintiff's Motion for Summary Judgment (Public Version) of132 Sealed Document, by Walmart, Inc issued Jul. 12, 2023 in U.S. District Court, Western District of Texas, Case #6:21-cv-00779-ADA (175 pages).
Q Technologies Inc Redacted Copy [Public Version] of108 Sealed Motion Plaintiff's Motion for Summary Judgment by Q Technologies, Inc. by Q Technologies, Inc. issued Jun. 27, 2023 in U.S. District Court, Western District of Texas, Case #6:21-cv-00779-ADA (247 pages).
Walmart Inc, Redacted Copy [Public Version] of115 Opposed Sealed Motion Defendant Walmart Inc.'s Motion to Exclude the Damages Apportionment Opinions of Stephen A. Holzen and Michael Brogioli Under Fed. R. Civ. Evid. 702 and Daubert by Walmart, Inc. by Walmart, Inc. issued Jun. 27, 2023 in U.S. District Court, Western District of Texas, Case #6:21-cv-00779-ADA (49 pages).
Walmart Inc. Redacted Copy [Public Version] of113 Opposed Sealed Motion Defendant Walmart Inc.'s Motion to Exclude Certain Opinions Identified in Dr. Michael Brogioli's and Dr. Robert Akl's Expert Reports by Walmart, Inc. by Walmart, Inc. issued Jun. 27, 2023 in U.S. District Court, Western District of Texas, Case #6:21-cv-00779-ADA (41 pages).
Walmart Inc, Redacted Copy [Public Version] of117 Sealed Motion Defendant Walmart Inc.'s Motion for Summary Judgment of Patent Ineligibility Pursuant to 35 U.S.C. Section 101 by Walmart, Inc. by Walmart, Inc. issued Jun. 27, 2023 in U.S. District Court, Western District of Texas, Case #6:21-cv-00779-ADA (134 pages).
Walmart Inc. Response to Motion, filed by Walmart, Inc., re100 Opposed Motion to Withdraw and Amend Answers to Defendant's Requests for Admission filed by Plaintiff Q Technologies, Inc. Walmart Inc.'s Statement of Non-Opposition in Response to Plaintiff Q Technologies, Inc.'s Motion to Withdraw and Amend Answers to Defendant's Requests for Admission issued Apr. 6, 2023 in U.S. District Court, Western District of Texas, Case #6:21-cv-00779-ADA (3 pages).
Q Technologies Inc Opposed Motion to Withdraw and Amend Answers to Defendant's Requests for Admission by Q Technologies, Inc. issued Mar. 16, 2023 in U.S. District Court, Western District of Texas, Case #6:21-cv-00779-ADA (114 pages).
Walmart Inc, Unopposed Motion to supplement Defendant Walmart Inc.'s Unopposed Motion to Supplement its Invalidity Contentions by Walmart, Inc. issued Mar. 14, 2023 in U.S. District Court, Western District of Texas, Case #6:21-cv-00779-ADA (125 pages).
Walmart Inc. Reply to Response to Motion, filed by Walmart, Inc., re45 Motion for Judgment on the Pleadings filed by Walmart, Inc. Walmart Inc's Reply in Support of its Rule 12(c) Motion for Failure to State a Claim for Pre-suit Willful Infringement and Injunctive Relief. issued Sep. 6, 2022 in U.S. District Court, Western District of Texas, Case #6:21-cv-00779-ADA (11 pages).
Q Technologies Inc Response in Opposition to Motion, filed by Q Technologies, Inc., re45 Motion for Judgment on the Pleadings filed by Walmart, Inc.—Plaintiff's Response to Walmart's 12(c) Motion for Failure to State a Claim for Pre-Suit Willful Infringement and Injunctive Relief issued Aug. 29, 2022 in U.S. District Court, Western District of Texas, Case #6:21-cv-00779-ADA (7 pages).
Q Technologies Inc Answer to44 Answer to Amended Complaint, Counterclaim Q Technologies, Inc.s Answer to Walmart, Inc.s Counterclaims issued Aug. 19, 2022 in U.S. District Court, Western District of Texas, Case #6:21-cv-00779-ADA (10 pages).
Walmart Inc., Motion for Judgment on the Pleadings by Walmart, Inc. issued Aug. 15, 2022 in U.S. District Court, Western District of Texas, Case #6:21-cv-00779-ADA (16 pages).
Walmart Inc.Answer to43 Amended Complaint with Jury Demand, Affirmative Defenses , Counterclaim against Q Technologies, Inc. by Walmart, Inc. issued Aug. 8, 2022 in U.S. District Court, Western District of Texas, Case #6:21-cv-00779-ADA (36 pages).
Q Technologies Inc Amended Complaint—First Amended Complaint for Patent Infringement against Walmart, Inc. amending1 Complaint. issued Aug. 8, 2022 in U.S. District Court, Western District of Texas, Case #6:21-cv-00779-ADA (16 pages).

\* cited by examiner

SYSTEMS AND METHODS FOR AUTHORIZED, PROXIMAL DEVICE TO DEVICE COMMUNICATION WITHOUT PRIOR PAIRING WITHIN A CONTROLLED COMPUTING SYSTEM

CROSS-REFERENCE TO RELATED APPLICATION

This application is a continuation of U.S. patent application Ser. No. 16/713,717, filed Dec. 19, 2019, which is a continuation of patent application Ser. No. 16/219,974, filed Dec. 14, 2018, which is a continuation of patent application Ser. No. 15/494,451, filed Apr. 22, 2017 which is a continuation of patent application Ser. No. 14/604,297, filed Jan. 23, 2015 which claims priority to U.S. Provisional Patent Application No. 61/931,562, entitled "Computer Program for the Transposition of PINs Into Cloud Stores", filed Jan. 25, 2014, which is incorporated herein by reference in its entirety for all purposes.

BACKGROUND

Online content sharing services allow a client to upload a file. The file may be identified by a uniform resource locator (URL). Other clients may access the file via the URL, and download the shared file.

SUMMARY

One aspect of the disclosure is generally directed to methods for location-based online content sharing using unique identifiers. A server and a plurality of clients may be connected to one or more networks. A first client may send a shared content to the server. The first client may also send a first location of the first client as well as a unique identifier for the shared content. The server may store the shared content. A second client may request the shared content, and the request may include the unique identifier and a second location of the second client. The server may determine that the second location is within a predefined distance from the first location. Upon such determination, the server may send the shared content to the second client.

Another aspect of the disclosure is generally directed to systems for location-based online content sharing using unique identifiers. The system may comprise a server connected to a network. A plurality of clients may also be connected to the network. The server may comprise memory and processor. Memory may store instructions, and the processor may execute the stored instructions. The server may receive, from a first client, a shared content, a first location of the first client, and a unique identifier for the shared content. The server may also receive a request from a second client, the request comprising a second location of the second client and the unique identifier for the shared content. The server may determine that the second location is within a predefined distance from the second client and the unique identifier. In response to this determination, the server may send the shared content to the second client.

BRIEF DESCRIPTION OF THE DRAWINGS

Those skilled in the art will appreciate that the summary is illustrative only and is not intended to be in any way limiting. The details of one or more implementations are set forth in the accompanying drawings and the description below. Other features, aspects, and advantages of the disclosure will become apparent from the description, the drawings, and the claims, in which:

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
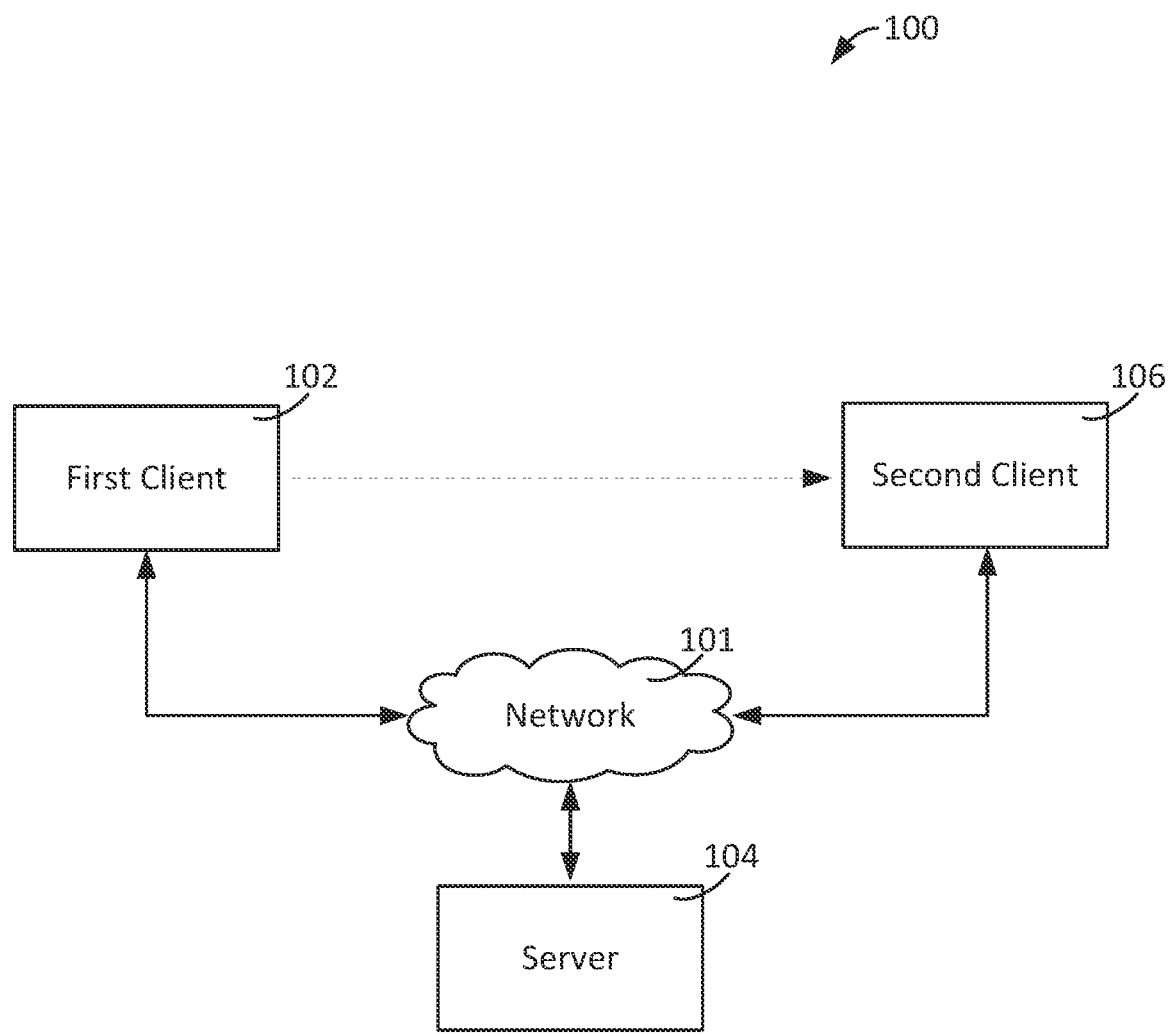
FIG. 1 is a block diagram of a computer system including a network, a first client, a second client, and a server, according to a described implementation.

FIG. 1 is a block diagram of a computer system 100 including a network 101, a first client 102, a second client 106, and a server 104. The system 100 may use at least one computer network 101. The network 101 may include a local area network (LAN), wide area network (WAN), a telephone network, such as the Public Switched Telephone Network (PSTN), a wireless link, an intranet, the Internet, or combinations thereof. The network 101 may connect one or more devices via an Open Systems Interconnection (OSI) model. In some implementation, the network 101 may use an internet protocol suite, including the Transmission Control Protocol (TCP) and the Internet Protocol (IP).

The first client 102, the second client 106, and the server 104 may each be a computing device. A computing device (e.g. a data processing system) may include one or more processors, memory, and network interface. The one or more processors may be configured to execute instructions stored in memory to perform one or more operations described herein. The one or more processors and the memory device may form a processing module. The processor may include a microprocessor, a general purpose processor, an application-specific integrated circuit (ASIC), a field-programmable gate array (FPGA), a data processor, a logic devices, a central processing unit (CPU), a graphics processing unit (GPU), a group of processing components, other suitable electronic processing components, or combinations thereof. The processor may be connected directly or indirectly (e.g. via a bus) to the memory and the network interface. The memory may include, but is not limited to, any type of volatile, non-volatile memory, media, memory device, electronic, optical, magnetic, semiconductor memory device, or any other storage or transmission device capable of providing processor with program instructions and/or data. The memory may include an optical disk, magnetic disk, hard disks, internal disks, removable disks, magneto-optical disks, memory chip, read-only memory (ROM), random-access memory (RAM), Electrically Erasable Programmable Read-Only Memory (EEPROM), erasable programmable read only memory (EPROM), flash memory, or any other suitable memory from which processor can read instructions and/or data. The instructions may include code and/or data from any suitable machine-readable code or source code. The machine code may be from source code, which may be in one or more computer programming languages (including scripting language or markup language) such as, but not limited to, ACTIONSCRIPT®, C, C++, C#, Cascading Style Sheets (CSS), DART®, ECMASCRIPT®, Extensible Markup Language (XML), JAVA®, JAVASCRIPT® including JAVASCRIPT® Object Notation (JSON), PERL®, Hyptertext Markup Language (HTML), PYTHON®, TypeScript, VBScript, VISUAL BASIC®, or any other language. In addition to the processing circuit, a computing device may include one or more databases configured to store data. A data storage device may be connected to a computing device through the network 101. The computing device may include input and/or output (e.g., an electronic display, a touch screen, a virtual reality display, a speaker, a keyboard, a pointing device, a mouse, a microphone, a printer, a gamepad, a camera, etc.). The computing device may be connected to the network 101 via a network interface. The network interface may be a communication interface that includes wired or wireless interfaces (e.g., jacks, antennas, transmitters, receivers, transceivers, wire terminals, Ethernet ports, WiFi transceivers, Bluetooth, Bluetooth Low Energy, near field communication (NFC), ultrasonic sounds, radio-frequency identification (RFID), etc.) for conducting data communications with local or remote devices or systems via the network 101. A network interface may have a corresponding module or software that works in conjunction with hardware components. The network interface may allow a computing device to communicate with and exchange data with other computing devices via the network 101. The network interface may receive data from or transmit data to the processor, memory, and/or any module or application in memory.

The first client 102 may be a computing device. Some implementations of the computer system 100 may include a plurality of first clients 102. The first client 102 may include any number and/or type of user-operable electronic device. For instance, a first client 102 may include a desktop computer, laptop, convertible PC, smartphone, wearable device, smart watch, tablet, phablet, personal digital assistant, set-top box, smart television, gaming console device, mobile communication device, remote workstation, client terminal, entertainment console, or any other device configured to communicate with other computing devices, systems, and servers via the network 101. The first client 102 may be capable of communicating with the server 104, and/or the second client 106 via the network 101. The first client 102 may be capable of determining its location, such as geographic location ("geolocation"). In some implementations, the first client 102 may determine its geographic location via global positioning system (GPS). In some implementations, the first client 102 may determine its geographic location via connection with a network 101. For instance, the first client 102 may be assigned an IP address by the network 101 and determine its geolocation via the IP address. In some implementations, the first client 102 may be capable of receiving location information from user input. For instance, a user may select a location on a map or designate coordinates. In some implementations, the location may be defined in terms of the network location or characteristics. For instance, the location of the first client 102 may be defined in terms of the IP address, ping or number of hops to a specified IP address, access to a specific network, type of network, etc.

The first client 102 can execute an application to send content to a server 104 over the network 101. An application may be a mobile application, a web browser, a chat program, a stand-alone application, a widget application, a plug-in application, or any type application. The widget and the plug-in application may be a third-party application. The application may be written in any programming language. For instance, the widget or the plug-in application may be written in JAVASCRIPT. The application may use an application programmable interface (API) to communicate to the server 104 or an API to communicate with a second application executing on the first client 102 configured to communicate with the server 104. The application may be configured to allow a user to select a content to be shared, and accept a unique identifier from the user. The application may also receive location input from the user, or use a location of the first client 102. The application on the first client 102 may send the shared content, unique identifier, and the location to the server 104. The shared content, unique identifier, and the location are described in greater detail below in relation to FIG. 4. In some implementations, the first client 102 may send the unique identifier to the second client 106 via the network 101 and/or via the network interface. For instance, the first client 102 may send the unique identifier to the second client 106 via a Bluetooth signal, NFC, or ultrasonic sound. In another instance, a first user of the first client 102 may communicate the unique identifier to a second user of the second client 106. For instance, the first user may tell the second user the unique identifier via email, short message service (SMS) text, instant messaging, speech, etc. In some implementations, the first user may update a website or a social networking site (e.g. via TWITTER) the unique identifier, through which the second user may obtain the unique identifier.

The second client 106 may be a computing device, similar to the first client 102. Some implementations of the computer system 100 may include a plurality of second clients 106. A plurality of second clients 106 may request the same shared content. A second client 106 may receive input from a user of the second client 106. The second client 106 may be configured to request the shared content from the server 104. In some implementations, the second client 106 may receive a notification from the server 104 without sending a request to the server 106. The notification may indicate, for instance, an availability of a shared content. In some implementations, the second client 106 may execute an application that communicates with the server 104 that downloads the shared content.

The server 104 may be a computing device. Some implementations of the computer system 100 may include a plurality of servers 104. A server 104 may be connected to the network 101 and be configured to communicate to a first client 102 and a second client 106. The server 104 may comprise memory, processor, and network interface. The server 104 may further comprise a database or be configured to communicate with a database. The server 104 may be part of an infrastructure provider or a cloud computing platform. The server 104 may execute one or more virtual machines. The server 104 is described in greater detail in relation to FIG. 3.

Figure 2A:
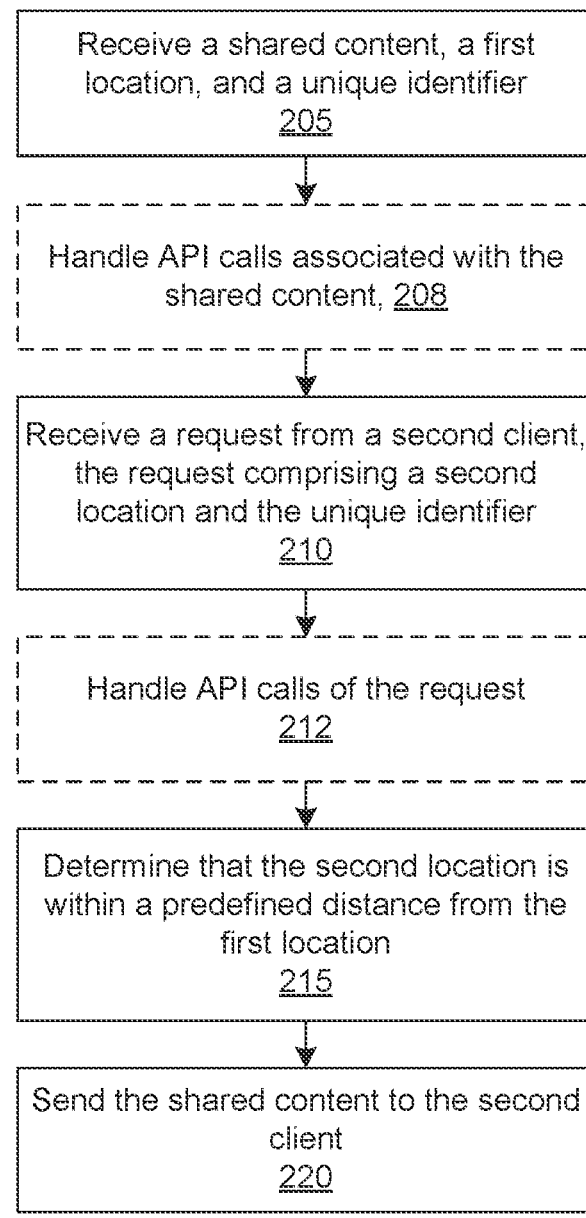
FIG. 2A is a flow diagram depicting a method for sharing content from a first client to a second client.

FIG. 2A is a flow diagram depicting a method for sharing content from a first client to a second client. In brief overview, the method 200 generally includes: receiving a shared content, a first location, and a unique identifier (step 205); receiving a request from a second client, the request comprising a second location and the unique identifier (step 210); determining that the second location is within a predefined distance from the first location (step 215); and sending the shared content to the second client (step 220). The method optionally includes handling API calls associated with the shared content (step 208) and handling API calls of the request (step 212).

Still referring to FIG. 2A, and in more detail, the method includes receiving a shared content, a first location, and a unique identifier (step 205). A server may receive the shared content, first location and unique identifier. A first client may send the shared content, first location and unique identifier. The server may associate the first location and the unique identifier with the shared content.

The shared content may comprise one or more of file, calendar event, document, picture, video, audio, streaming media, rich media, and application data. In some implementations, the shared content may be specified by the first client and retrieved by the server via the network. For instance, the first client may specify the URL of the shared content and the server may download the shared content. In some implementations, the shared content may be hosted on a file sharing service and the server may download or copy the content from the file sharing service. In some implementations, the server may store a reference or the location of the content (e.g. the URL or on the file sharing service) instead of downloading or copying the content. The shared content may comprise an access to a stream of data from the first client 102; for instance, the shared content may enable a video stream and/or a voice-over-IP from the first client 102 to a second client 106. The shared content, first location and unique identifier are described in greater detail in relation to FIG. 4.

In some implementations, the server may determine whether the unique identifier is already in use. For instance, the server may receive a unique identifier, compare it against a plurality of unique identifiers in a database, and determine that the received unique identifier may not be used because it is in the plurality of unique identifiers. The server may then notify the first client for another unique identifier or suggest a generated unique identifier not in the plurality of unique identifiers. In some implementations, the server and/or the first client may generate a unique identifier. In some implementations, the first client may not send the unique identifier, and the server may generate or assign the unique identifier to the shared content. For instance, the unique identifier may be generated based on the first location. In some implementations, the first client may be logged in to an account before sending the shared content, and the server and/or the first client may generate or assign a unique identifier based on the account. The unique identifier may be generated based on one or more of the account, the shared content, the first location, the predefined distance, and/or configuration settings. For instance, the unique identifier may be generated via a hash function or a concatenation of the first location and an account name of the account. In another instance, a characteristic of the shared content, e.g. file name or file size, may be used as an input to a hash function that outputs a unique identifier. In some implementations, the unique identifier may be randomly generated. In some implementations, if the unique identifier is already in use, the server may generate a second unique identifier not in the plurality of unique identifier. In some implementations, the server may communicate with a database storing a plurality of unique identifiers and receive an available unique identifier not in the database. In some implementations, the server may filter the unique identifier, for instance for profanity or vulgar words. The filtered unique identifier may be presented to a first user of the first client or renamed. In some implementations, the server may filter or rename a received unique identifier based on availability in the database storing the plurality of unique identifiers.

In some implementations, a shared content may have the same unique identifier as one or more unique identifiers in the plurality of unique identifiers, such that the unique identifier may not be unique. In such implementations, a combination of the unique identifier and the first location may be unique as compared to all other combinations in the plurality of unique identifiers with the respective locations. For instance, the unique identifier may be "Interview Calendar Invite" with an associated first location in Atlanta, Georgia Another unique identifier in the plurality of unique identifiers may also be "Interview Calendar Invite" with an associated location of Boston, Massachusetts Both combinations of unique identifiers and locations may be allowed. In some implementations, a combination of the unique identifier and an account associated with the first location may be unique as compared to all other combinations in the plurality of unique identifiers with the respective accounts.

In some implementations, the first location may be a location of the first client, a location of an account associated with the first client, or a location specified on the first client. For instance, the first location may be determined by the first client which be a GPS-enable device. In another instance, the first client may be logged in under a first account associated with a first client. In yet another instance, a first user may specify the first location on a map presented on the first client. In yet another instance, an application or a plug-in executing on the first client may specify the first location. In some implementations, the first client may not send the first location, and the server may determine the first location of the first client. For instance, the server may determine a network characteristic of the first client (e.g. IP address) and determine the location of the first client. In some implementations, the first client may be logged in to an account before sending the shared content, and the server may determine a default location from the account; when the first client uploads the shared content, the server may associate the default location with the shared content. In some implementations, the server may obtain the first location by querying the first client. The first location may be defined in terms of geolocation, postal address, IP address, as part of a geographic hierarchy, etc.

In some implementations, the server may further receive a predefined distance from the first client or specified by an account associated with the first client. The predefined distance may define, delimit, or restrict the shared content within an area, a geographic region, or a location centered on the first location. In some implementations, the predefined distance may define a maximum distance between the first location and a second location. The predefined distance may be any distance between, for instance, zero feet to five hundred miles. In some implementations, the predefined distance may define a maximum distance between the first client and the second device. In some implementations, the server may not receive a predefined distance, and in such implementations, the server may associate a default predefined distance with the shared content. In some implementations, the predefined distance may be unlimited, such that the shared content may be accessed from anywhere. In some implementations, the predefined distance may be defined in terms of a geographic hierarchy. The predefined distance may be defined in terms of a zip code, phone number area code, city, county, state, country, or any other geographic designation. For instance, the predefined distance may specify that any requests for the shared content may be made from within the same zip code as the first location. In some implementations, the predefined distance may be defined in terms of network characteristic. For instance, the predefined distance may be defined in terms of range of IP addresses, geographic regions associated with IP addresses, pings or number of hops to a specified IP address or domain address, access to a specific network such as a specific service set identifier, type of network such as WiFi or cellular data connection, etc.

In some implementations, the server may receive additional configuration settings from the first client. For instance, the server may receive a configuration setting for whether the shared content should be broadcasted to one or more second clients within a predefined distance from the first location. In implementations where the server receives a broadcast setting for the shared content, the serve may identify one or more second clients to which the server will broadcast the availability of the shared content. For instance, the server may notify a plurality of second clients that are each determined to be within a predefined distance from the first location, as described in relation to step 215. In some implementations, each second client may be associated with an account and/or a setting that specifies that the second client may receive or view broadcasted shared content. In some implementations, each second client may be associated with the unique identifier, with a password associated with the shared content, or any other authorization or authentication. In some implementations, the server may determine the second location in response to the second client executing an application or a plug-in. After notifying the plurality of second clients, the server may receive from a second client a request for the shared content as described in relation to step 210.

In another instance, the server may receive a password for the shared content, such that any second client requesting the shared content with the unique identifier must also provide the password to access the shared content. In some implementations, one or more configuration settings may be used together. For instance, the broadcast setting may be combined with the password setting; a password may be required to be notified of a broadcast of the shared content and/or to access the shared content. In some implementations, the configuration setting may include additional authorization or authentication required for accessing the shared content. For instance, a second client must provide the additional authorization when attempting to access the shared content. The additional authorization or authentication may be used by an application or a plug-in executing on the first client and/or the second client. In some implementations, the configuration setting may include a valid time parameter, which may define a duration of time the shared content will be available to be accessed or a time at which the shared content will not be accessible. The duration of time may be any duration of time between, for instance, 30 seconds to indefinite (e.g. until the shared content is taken down by a first account associated with the shared content, until the first account is deactivated, or until the collapse of the universe). In some implementations, one or more of the configuration settings may be set with default values. For instance, the default value for the duration of time may be one year.

In some implementations, the server may optionally handle API calls associated with the shared content (step 208). The API calls may be part of the shared content or part of configuration settings. The API calls may include one or more parameters. For instance, a plug-in identifier may be a parameter of an API call. A plug-in may be associated with a plug-in identifier which may be passed in as a parameter of an API call. A plug-in may include, for instance, a chat program, or a pillow fight program, etc. In some implementations, the API call may include accessing a database, to modify or create a shared content. For instance, a pillow fight plug-in may make an API call that updates a document in a database that stores a time and location of a pillow fight event. In some implementations, an API call may generate a unique identifier such that the unique identifier comprises the plug-in identifier, shared content, and or the first location.

The server may receive a request from a second client, the request comprising a second location and the unique identifier (step 210). The server may determine that the unique identifier received from the second client is the same as the unique identifier received from the first client. In some implementations, the second location may be a location of the second client, a location of an account associated with the second client, or a location specified on the second client. For instance, the second location may be determined by the second client which may be a GPS-enabled device. The second location may be associated with the second client or with a second account logged in on the second client. The second location may be specified by a second user on the second client or by an application or a plug-in executing on the second client. In some implementations, the request may not specify a second location. The server may retrieve a default location associated with the second client or may process the request without a second location.

The second client may receive the unique identifier from the first client. The first client may send the unique identifier to the second client. In some implementations, the first client may send the unique identifier via a Bluetooth signal. For instance, the first client may pair with the second client via a Bluetooth connection. In another instance, the first client may transmit the unique identifier to the second client without pairing via a Bluetooth signal using advertising mode or friendly name. In some implementations, the second client may receive the unique identifier from the first client via NFC. In some implementations, the second client may scan for the unique identifier. For instance, the second client may scan a QR code and decode it for the unique identifier. In another instance, the second client may scan a RFID tag for the unique identifier. In some implementations, a first user of the first client may communicate the unique identifier to a second user of the second client. The second client may then use the unique identifier as part of a request to the server for the shared content.

In some implementations, the server may further receive a password. The server may receive the password separately (e.g. in a subsequent communication with the second client) or as part of the request comprising the unique identifier and the second location. The password may be required depending on whether a password was specified by the first client when uploading the shared content. The server may further receive additional authorization or authentication. For instance, a plug-in executing on the second client may be a chat program, and the chat program may send an authorization information specifying that the second client is authorized by the first client to communicate with the first client.

In some implementations, the server may check the unique identifier against a plurality of unique identifiers. The server may find one unique identifier from the plurality of unique identifiers that matches the unique identifier received from the second client. In some implementations, the server may access or query a database storing the plurality of unique identifiers. The server may access the database with the unique identifier or with a combination of the unique identifier and the second location. The database may return an entry in the database that comprises the shared content, the unique identifier, and the first location. In some implementations, the entry may further comprise the account associated with the first device and/or the shared content. In some implementations, the database may first look for the unique identifier received from the second client, and upon not finding the unique identifier, notify the server that no entry with the specified unique identifier exists. In some implementations, the database may find a plurality of entries, each entry matching the unique identifier received from the second client and each entry associated with a respective shared content. For instance, the unique identifier is "Interview Calendar Invite," there may be multiple entries in the database, each comprising a unique identifier of "Interview Calendar Invite" and a respective shared content. One of the shared content may be for an interview in Atlanta, Georgia, and another shared content may be for an interview in Boston, Massachusetts In some implementations, each of the plurality of entries may be considered as a match for the unique identifier. In some implementations, the server and/or the database may not find any unique identifiers in the plurality of unique identifiers that matches the unique identifier received from the second client. In such implementations, the server may notify the second client that the received unique identifier is invalid.

In some implementations, the server may determine that the unique identifier in the plurality of unique identifiers is associated with a shared content and a password. In such implementations, the server may determine whether the password provided by the second client matches the password associated with the shared content. If the passwords do not match, the server may inform the second client that the password provided by the second client was invalid. If the passwords match, the server may continue processing the request from the second client. In some implementation, the server may perform additional checks on authorization and authentication. For instance, the unique identifier found in the plurality of unique identifier may be associated with a shared content and additional authorization and/or authentication.

In some implementations, the server may optionally handle API calls associated with the request (step 212). The API calls may be part of the request. In some implementations, the API calls may be generated based on the unique identifier. For instance, part of the unique identifier may be a plug-in identifier. The API calls may include one or more parameters. For instance, a plug-in identifier may be a parameter of an API call. In some implementations, the API call may include accessing a database, to modify or access a shared content. For instance, a pillow fight plug-in may make an API call that access a document in a database that stores the time and location of a pillow fight event.

The server may determine that the second location is within a predefined distance from the first location (step 215). After finding a unique identifier that matches, the server may compare the first location associated with the found unique identifier with the second location of the response from the second client. The comparison of the first location and the second location may be a determination of a distance between the first location and the second location. The server may determine that the distance is within (or less than) a predefined distance. The distance may be determined as a geographical distance, for instance using a flat-surface formulae, spherical-surface formulae, or a ellipsoidal-surface formulae. The predefined distance may be a default value, defined by the first client, or associated with the shared content. In some implementations, the server may determine that the distance between the first location and the second location is greater than the predefined distance. In response, the server may inform the second client that the shared content is unavailable due to the distance being greater than the predefined distance. In some implementations, the server may compare the first location with the second location using a geographic hierarchy. For instance, the first location may specify a city, and the predefined distance may specify that the second location must be within the same city as the first location. In some implementations, the server may compare the first location with the second location using a network characteristic specified by the predefined distance. For instance, the predefined distance may specify a range of IP addresses and the server may determine whether the second client at the second location has an IP address that is within the range of IP addresses. In some implementations, matching passwords and performing additional authorization and authentication may occur after determining that second location is within a predefined distance from the first location.

In some implementations, the server may determine a plurality of distances for a plurality of entries that each match the unique identifier, and determine one or more entries from the plurality of entries that are within a predefined distance from the first location. For instance, the server may find a plurality of entries in the database, each entry comprising unique identifier of "Pillow Fight." Each entry may be associated with a respective location. The server may compare the second location in the request with each respective location and determine one or more entries that are each within a predefined distance from the first location. The server may display the one or more entries, or the one or more shared content associated with the entries, to the second client.

In some implementations, the server may not determine that the second location is within a predefined distance from the first location. For instance, the server may determine that the predefined distance is not defined, a negative value, infinity, or some value indicating that the second location does not need to be within the predefined distance of the first location. In another instance, a configuration setting associated with the shared content may indicate that the second location does not need to be within the predefined distance from the first location.

The server may send the shared content to the second client (step 220). The second client may access, download, or copy the shared content. The second client or the server may open a stream of data referenced by the shared content. The server may send a reference to a location (e.g. a URL) of the shared content. For instance, the shared content may be on a file-sharing service. An application executing on the second client may process the shared content. In some implementations, the second client may communicate to the server or to the first client the receipt of the shared content.

Figure 2B:
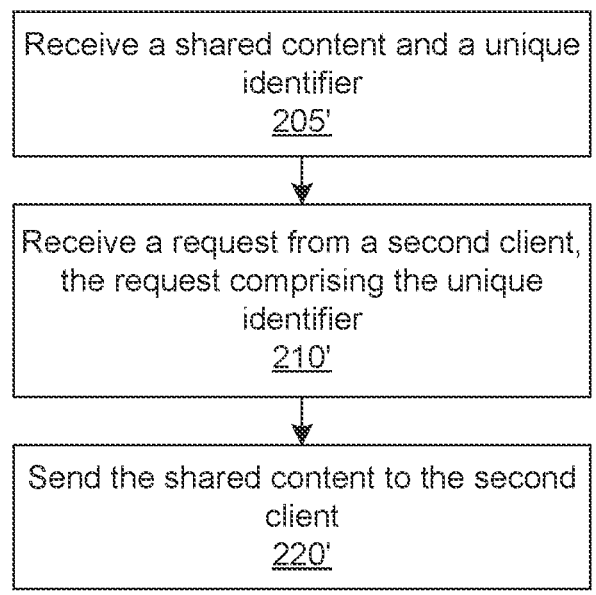
FIG. 2B is another flow diagram depicting a method for sharing content from a first client to a second client.

FIG. 2B is another flow diagram depicting a method for sharing content from a first client to a second client. In brief overview, the method 250 generally includes: receiving a shared content and a unique identifier (step 205'); receiving a request from a second client, the request comprising the unique identifier (step 210'); and sending the shared content to the second client (step 220').

Still referring to FIG. 2B, and in more detail, the method includes receiving a shared content and a unique identifier (step 205'). This step may be similar to step 205 of FIG. 2A. The server may associate the shared content with the unique identifier. A first client may send the shared content and the unique identifier. In some implementations, the first client may have Bluetooth capabilities, and in other implementations, the first client may lack Bluetooth capabilities. The shared content may be associated with an account associated with or logged in on the first client.

The server may receive a request from a second client, the request comprising the unique identifier (step 210'). This step may be similar to step 210 of FIG. 2A. The server may determine that the unique identifier received from the second client is the same as the unique identifier received from the first client. In some implementations, the second client may receive the unique identifier from the first client. For instance, the second client may receive the unique identifier from the first client via a Bluetooth signal, as the second client may be close (e.g., within range of the Bluetooth signal) to the first device. In some implementations, the second client may receive input of the unique identifier from a user of the second client. For instance, the second client may open a dialog or a text input that allows the user to input the unique identifier, which is transmitted to the server. In some implementations, the second client may scan for the unique identifier. For instance, the second client may scan a QR code and decode it for the unique identifier. In another instance, the second client may scan a RFID tag for the unique identifier. The second device may receive the unique identifier from the first device, a user of the first device, a user of the second device, or an input device.

The server may send the shared content to the second client (step 220'). This step may be similar to step 220 of FIG. 2A. If the server may determine that the unique identifier received from the second client is the same as the unique identifier received from the first client, the server may allow the second client to access, download, or copy the shared content. The second client or the server may open a stream of data referenced by the shared content. The server may send a reference to a location (e.g. a URL) of the shared content.

Figure 3:
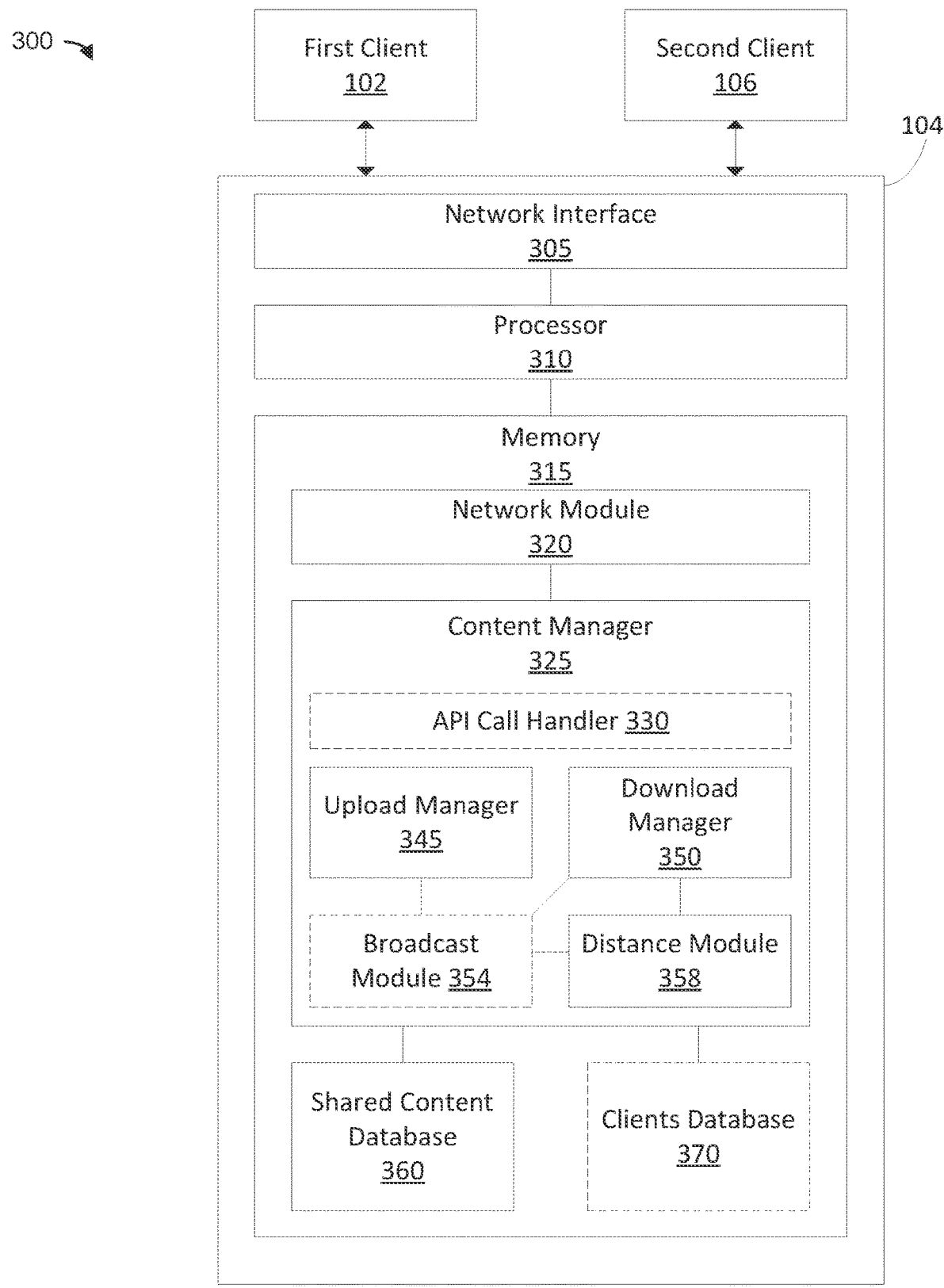
FIG. 3 is a block diagram illustrating an implementation of the server of FIG. 1 in greater detail.

FIG. 3 is a block diagram illustrating an implementation of the server of FIG. 1 in greater detail, shown to include a network interface 305, a processor 310, and memory 315. The network interface 305 may be one or more communication interfaces that includes wired or wireless interfaces (e.g., jacks, antennas, transmitters, receivers, transceivers, wire terminals, Ethernet ports, WiFi transceivers, wireless chipset, air interface etc.) for conducting data communications with local or remote devices or systems via the network 101. For instance, the network interface 305 may allow the server 104 to communicate with one or more first clients 102, one or more second clients 106, other servers 104 and one or more databases. In some implementations, the network interface 305 may have corresponding modules or software that work in conjunction with hardware components. The network interface 305 may receive a shared content, a first location and a unique identifier from the first client 102. The network interface 305 may also receive a predefined distance and other configuration settings from the first client 102. The network interface 305 may receive a request from a second client 106, the request comprising a second location and the unique identifier. The request may be to access, copy, or download the shared content. The network interface 305 may send the shared content to the second client 106. The network interface 305 may send a reference to the shared content to the second client 106. The network interface 305 may send a notification to a second client 106 regarding an availability of a shared content at a second location within a predefined location of a first location. The network interface 305 may send a broadcast to a plurality of second clients 106 that are each associated with a second location determined to be within a predefined location from the first location of the shared content.

The processor 310 may be implemented as a general purpose processor, an application specific integrated circuit (ASIC), one or more field programmable gate arrays (FPGAs), a Central Processing Unit (CPU), a Graphical Processing Unit (GPU), a group of processing components, or other suitable electronic processing components. The processor 310 may be connected directly or indirectly to the memory 315 and the network interface 305. The processor 310 may read, write, delete, or otherwise access data stored in memory 315 or other components. The processor 310 may execute instructions stored in memory 315.

Memory 315 may include one or more devices (e.g., RAM, ROM, flash memory, hard disk storage, etc.) for storing data and/or computer code for completing and/or facilitating the various processes, layers, and modules described in the present disclosure. Memory 502 may include volatile memory or non-volatile memory. Memory 315 may include database components, object code components, script components, or any other type of information structure for supporting the various activities and information structures described in the present disclosure. In some implementations, memory 315 is communicably connected to processor 310 and includes computer code (e.g., data modules stored in memory 315) for executing one or more processes described herein. In brief overview, memory 315 is shown to include a network module 320, content manager 325, and shared content database 360. Memory 315 may further include one or more additional databases such as a clients database 370. In some implementations, one or more databases may be connected to the server 104 via the network interface 305 over a network 101.

Still referring to FIG. 3, memory 315 is shown to include a network module 320. The network module 320 may work in together with the network interface 305 to receive and transmit data via the network 101. The network module 320 may be part of an application, operating system, kernel, driver, runtime environment, and/or other software. The network module 320 may provide one or more applications or modules in memory 315 access to the network 101.

Memory 315 is further shown to include a content manager 325, which comprises an optional API call handler 330, an upload manager 345, a download manager 350, an optional broadcast module 354, and a distance module 358. In some implementations, the upload manager 345 and the download manager 350 may be a single manager or application. The content manager 325 may communicate with or operate under a virtual machine, an operating system, kernel, runtime environment, and/or other software. For instance, the content manager 325 may operate under NODE.JS runtime environment.

The upload manager 345 may receive, from the network module 320, a shared content, a first location and a unique identifier. In some implementations, the upload manager 345 may query a shared content database 360 to determine whether the unique identifier is available. For instance, the shared content database 360 may store a plurality of unique identifiers, and the upload manager 345 may query the shared content database 360 with the unique identifier. The upload manager 345 may associate the received shared content with an account. The upload manager 345 may receive additional configuration settings from the network module 320. The upload manager 345 may notify a first client 102 via the network module 320 that the received unique identifier is unavailable. The upload manager 345 may generate a unique identifier for the shared content. The upload manager 345 may obtain a first location associated with the shared content. For instance, the upload manager 345 may obtain a location associated with an account logged in on the first device from the clients database 370. The upload manager 345 may query the first device for its location to use as the first location. The upload manager 345 may store the shared content in the shared content database 360. The upload manager 345 may communicate with the broadcast module 354 based on configuration settings associated with the shared content. For instance, the configuration settings may specify that the shared content should be broadcasted to one or more devices within a predefined location from the first location.

The content manager 325 may further include a download manager 350. The download manager 350 may receive a request from a second client 106. The request may comprise a unique identifier and a second location. The second location may be a location of the second client 106, a location of an account associated with the second client 106, or a location specified on the second client 106. The download manager 350 may query the second client 106 for the second location. The download manager 350 may query a clients database 370 for a location of the second client 106 or a location associated with an account associated with the second client 106. The download manager 350 may match the unique identifier from the second client 106 with one or more of a plurality of unique identifiers. The plurality of unique identifiers may be stored in the shared content database 360 and/or a database of unique identifiers. The download manager 350 may communicate with the distance module 358 to determine whether a second location is within a predefined location of the first location associated with the shared content. The download manager 350 may compare a password received from the second client 106 with a password associated with the shared content. The download manager 350 may provide the shared content to the second client 106. For instance, the download manager 350 may provide the shared content if the password provided by the second client 106 matches the password associated with the shared content.

The content manager 325 may optionally include a broadcast module 354. The broadcast module 354 may broadcast the availability of the shared content based on a configuration setting associated with the shared content. In some implementations, the broadcast module 354 may be configured by the upload manager 345. For instance, the upload manager 345 may generate or register an event with the broadcast module 354. The broadcast module 354 may execute on a different server. The broadcast module 354 may execute a process or a thread that notifies one or more second clients 106 the availability of the shared content. The broadcast module 354 may notify a second client 106 when the broadcast module 354 detects that the second location of the second client 106 is within a predefined distance from the first location 102. For instance, if a second client 106 enters an area defined by the predefined distance and the first location, the broadcast module 354 may notify the second client 106 the availability of the shared content. In some implementations, the broadcast module 354 may access the clients database 370 to determine one or more locations of one or more second clients 106. In some implementations, the broadcast module 354 may access the clients database 370 to determine an account setting associated with a second client 106 to determine whether to notify the second client 106. The broadcast module 354 may communicate with the distance module 358 to determine whether a second location is within a predefined location of the first location associated with the shared content.

The content manager 325 may further include a distance module 358. The distance module 358 may determine that the second location of the request is within a predefined distance from the first location. The distance module 358 may be called by the download manager 350, the broadcast module 354, or any other application, manager, or module in memory 315. The distance module 358 may obtain the first location stored in the shared content database 360. For instance, the download manager 350 may call the distance module 358 with the first location as a parameter of the call, where the download manager 350 access the shared content database 360 for the shared content and the first location. The distance module 358 may further obtain the predefined distance associated with the shared content. The predefined distance may be stored in the shared content database 360. The predefined distance may be defined in terms of zip code, phone number area code, city, county, state, country, any other geographic designation, or network characteristics.

The content manager 325 may further include an API call handler 330. The API call handler 330 may be connected to the upload manager 345 and the download manager 350. The API call handler 330 may execute one or more API calls made by the first client 102 or the second client 106. The API calls from the first client 102 may be associated or included with the shared content from the first client 102. The API calls from the second client 106 may be from the request from the second client 106. The API call handler 330 may receive one or more parameters for an API call. One of the parameters may be a plug-in identifier. The API call handler 330 may pass one or more parameters to a plug-in module (not shown) such as a chat plug-in.

The memory 315 may include a shared content database 360. The shared content database 360 may be a document-oriented database, a relational database, object model database, a structure query language (SQL) database, a not-only SQL (NoSQL) database, or any other type of database. In some implementations, the shared content database 360 may be a MONGODB. The shared content database 360 may connected to the server 104 via a network 101. The shared content database 360 may receive the shared content from the content manager 325, API call handler 330, upload manager 345. The shared content database 360 may receive a first location, unique identifier, predefined distance, and/or configuration settings. The shared content database 360 may store a plurality of shared contents. The shared contents may be stored with a respective first location, unique identifier, predefined distance, and/or configuration settings. The shared content database 360 may be queried with a unique identifier to determine whether the unique identifier is currently in use. The shared content database 360 may generate a unique identifier that is not currently in use. In some implementations, the shared content database 360 may include a plurality of unique identifiers.

The memory 315 may optionally include a clients database 370. In some implementations, the clients database 370 may be included with the shared content database 360. In some implementations, the clients database 370 may be a document-oriented database, a relational database, object model database, a structure query language (SQL) database, a not-only SQL (NoSQL) database, or any other type of database. The shared content database 360 may connected to the server 104 via a network 101. The clients database 370 may store one or more accounts associated with the first client 102 and the second client 106. The clients database 370 may store locations of the first client 102 and the second client 106. The content manager 325 including the upload manager 345, download manager 350, broadcast module 354, and the distance module 358, may access or modify account settings, first location, or second location from the clients database 370.

Figures 4, 5:
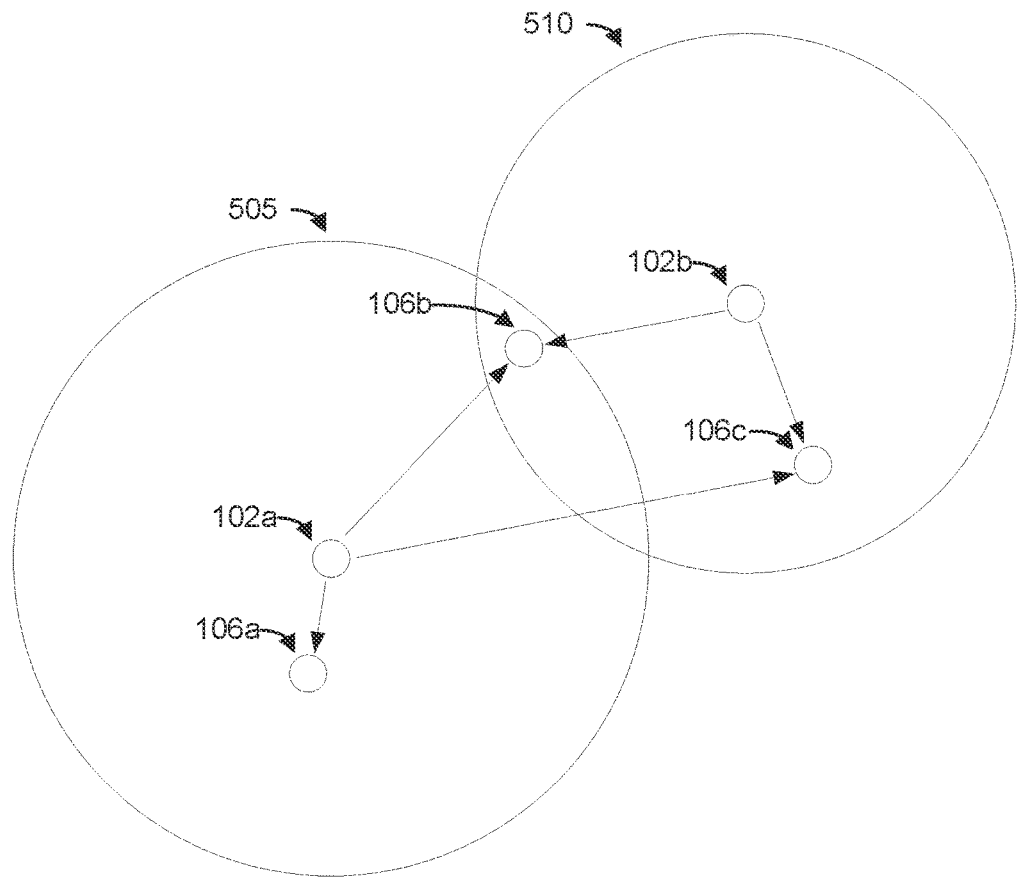
FIG. 4 is an illustration of data received from a first client at a server.
FIG. 5 is an illustrative diagram depicting a plurality of first clients and a plurality of second clients.

FIG. 4 is an illustration of data 400 received from a first client at a server. The server may receive shared content 405 and may optionally receive first location 410, unique identifier 415, predefined distance 420, and/or configuration settings 425. The shared content 405 may include a file, calendar event, document, text, image, animation, video, audio, rich-media, or any other data used by the application. In some implementations, an application or a plug-in executing on the first client may generate the shared content. The first location 410 may be defined in terms of a geolocation, a network location or characteristics, geographic hierarchy location, or any other location. The first location 410 may be obtained from the first client or an account associated with the first client. For instance, the server may receive the first location 410 from the first client or query the first client for the first location 410. The unique identifier 415 may be obtained from the first client or generated by the server. For instance, the server may receive the unique identifier 415 from the first client, generate the unique identifier 415 based on the shared content 405, or randomly generate the unique identifier 415. The unique identifier 415 may comprise a string of characters. For instance, the unique identifier 415 may include alphanumeric, symbols, punctuations, and other characters. The predefined distance 420 may be obtained from the first client. In some implementations, the predefined distance 420 may be set to a default predefined distance. The predefined distance 420 may be defined in terms of geographic distance, geographic hierarchy, network characteristic, or any other distance. In some implementations, configuration settings 425 may include whether the shared content 405 should be broadcasted, password for the shared content 405, additional authorization or authentication, and/or a duration of time during which the shared content 405 will be available. One or more configuration settings 425 may be provided by the first client or set to a default value. The data 400 may be stored in one or more databases, such as the shared content database.

FIG. 5 is an illustrative diagram 500 depicting locations of a plurality of first clients 102a-b and a plurality of second clients 106a-c. A first client 102a may send a shared content to a server (not shown) at a first location of the first client 102a. The shared content may be associated with a predefined distance that defines a first area 505. The first client 102a may send a unique identifier associated with the shared content to the plurality of second clients 106a-c. For instance, the first client 102a may send the unique identifier to a second server 106a via ultrasonic sound, to another second server 106b via Bluetooth, and to yet another second server 106c via SMS text message. Each of the plurality of second clients 106a-c may send a request to the server with the unique identifier and a respective second location. For instance, a second client 106a may send a request to the server with its own location as the second location and the unique identifier received from the first client 102a. In response to each request, the server may determine whether the second client making the request is within the area 505, e.g. whether the second location is within a predefined distance from the first location. In response to the request from second clients 106a and 106b, the server may determine that the two second clients 106-b are within the area 505 and send the shard content to the second clients 106a-b. The server may also determine that one of the second clients 106c is outside the area 505 and notify that second client 106c that the shared content from the first client 102a is not available at the present location of the second client. In some implementations, the second client 106c may later move within the area 505 and request the server for the shared content, at which point the server may send the shared content to the second client 106c.

Another first client 102b may upload another shared content from a first location. The first client 102b may also provide a predefined distance that defines a smaller area 510 than the area 505 defined by the predefined distance associated with the other first client 102a. The first client 102b may provide a unique identifier, password, and a broadcast setting that specifies that server will notify second clients 106b-c that are within the smaller area 510 of a shared content from the first client 102b. The server may not notify a second client 106a that is outside the smaller area 510. However, if the second client 106a later moves within the smaller area 510, the server may notify the second client 106a of the availability of the shared content from the first client 102b.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple disks, or other storage devices). Accordingly, the computer storage medium is both tangible and non-transitory. The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a smart phone, a smart watch, a smart television, a personal digital assistant (PDA), a mobile audio or video player, a game console, a set-top box, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and optical disks). The processor and the memory may be supplemented by, or incorporated in, special purpose logic circuitry.

To provide for interaction with a user, implementations of the subject matter described in this specification may be implemented on a computer having a display device (e.g., a LCD (liquid crystal display), OLED (organic light emitting diode), TFT (thin-film transistor), a plasma display, flexible display, or any other monitor for displaying information to the user. The computer may also have an input (such as a keyboard, a pointing device, e.g., a mouse, trackball, etc., or a touch screen, touch pad, etc.) by which the user may provide input to the computer. Other kinds of devices may be used to provide for interaction with a user as well. For instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's device in response to requests received from the web browser.

Implementations of the subject matter described in this disclosure may be implemented in a computing system that includes a back-end component (e.g., as a data server), a middleware component (e.g., an application server), and/or a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

The invention claimed is:

1. A method for facilitating authorized, proximal device-to-device communication within a controlled computing system, the method comprising:

storing, in one or more databases associated with a server, within the controlled computing system, a computer-generated identifier, wherein the computer-generated identifier allows access to one or more entries of shared content stored within the controlled computing system by a plurality of authorized clients within the controlled computing system, wherein authorization of the plurality of authorized clients is associated with an authorized application operating on the plurality of authorized clients, and wherein the computer-generated identifier is associated with at least one of: (i) the one or more entries of shared content stored within the controlled computing system, or (ii) one or more references to the one or more entries of shared content stored within the controlled computing system;
receiving, via an API call handler of the server, a request from the authorized application of a second client comprising the computer-generated identifier and an authorization parameter stored in the authorized application of the second client, wherein the request is generated by the authorized application of the second client in response to the second client receiving the computer-generated identifier from a first client comprising a smartphone without prior pairing of the first client and the second client, wherein the second client receives the computer-generated identifier from the first client by one of: (i) scanning, by the second client, a QR code presented by the first client, (ii) opening a dialog GUI or input of the second device to receive the computer generated identifier of the first device, or (iii) a Bluetooth LE, NFC or other radio signal received by the second client directly from the first client without prior pairing;
transmitting a query from the server to the one or more databases based on receiving the request, wherein in response to the query the one or more databases provide a response comprising the one or more entries of shared content associated with the computer-generated identifier; and
transmitting, via the API call handler of the server, the one or more entries of shared content to the second client, wherein the second client executes the authorized application to download or stream the one or more entries of shared content from the server.

2. The method of claim 1, further comprising receiving, via the API call handler of the server, the one or more entries of shared content or the one or more references to the one or more entries of shared content, from the first client.

3. The method of claim 2, further comprising receiving, via the API call handler of the server, the computer-generated identifier being associated with the one or more entries of shared content or the one or more references to said one or more entries of shared content, from the first client.

4. The method of claim 1, wherein the computer-generated identifier is generated by the first client.

5. The method of claim 1, further comprising receiving, at the server, a location of the first client.

6. The method of claim 5, wherein the query further comprises at least one of: a location of the second client, or a default location.

7. The method of claim 1, further comprising utilizing, at the server a time parameter outlining a time limit when the one or more entries of shared content may be accessed using the computer-generated identifier, to prevent access after the time limit has expired.

8. The method of claim 1, wherein the query further comprises at least one of: a location of the second client, or a default location.

9. A method for facilitating authorized proximal device-to-device communication within a controlled computing system:
storing, in one or more databases associated with a server, within the controlled computing system, a computer-generated identifier, wherein the computer-generated identifier allows access to one or more entries of shared content stored within the controlled computing system by a plurality of authorized clients within the controlled computing system, wherein authorization of the plurality of authorized clients is associated with an authorized application operating on the plurality of authorized clients, and wherein the computer-generated identifier is associated with at least one of: (i) the one or more entries of shared content stored within the controlled computing system, or (ii) one or more references to the one or more entries of shared content stored within the controlled computing system;
receiving, via an API call handler of the server, a request comprising the computer-generated identifier and an authorization parameter stored in the authorized application, from the authorized application of a second client, wherein the second client is a smartphone, wherein a first client sends the computer-generated identifier to the second client without prior pairing of the first client and the second client, wherein the first client sends the computer-generated identifier to the second client based on one of: (i) presenting, by the first client, a QR code, (ii)-presenting, by the first client, the computer generated identifier for entry into a dialog GUI or input of the second device, or (iii) a Bluetooth LE, NFC or other radio signal directly transmitted by the first client without prior pairing;
transmitting a query from the server to the one or more databases based on receiving the request, wherein in response to the query the one or more databases provide a response comprising the one or more entries of shared content associated with the computer-generated identifier; and
transmitting, via the API call handler of the server, the one or more entries of shared content to the second client operating the authorized application, wherein the server allows the second client to download or stream the one or more entries of shared content.

10. The method of claim 9, further comprising receiving, via the API call handler, the computer-generated identifier from the first client.

11. The method of claim 10, further comprising receiving, via the API call handler, the one or more entries of shared content from the first client.

12. The method of claim 11, wherein the server receives the one or more entries of shared content from the first client by receiving a reference to the one or more entries of shared content.

13. The method of claim 10, wherein the computer-generated identifier is generated by the first client.

14. The method of claim 9, wherein the server receives an account associated with the second client rather than, or in addition to the computer-generated identifier from the second client, and transmits the one or more entries of shared content to the second client based on the account.

15. The method of claim 9, wherein the query further comprises additional information received from the second client.

16. The method of claim 9, wherein transmitting the one or more entries of shared content to the second client comprises transmitting a reference to a location of the one or more entries of shared content contained within the one or more databases, to the second client.

17. The method of claim 16, wherein the server allows the second client to download or access the one or more entries of shared content based on the reference to a location of the one or more entries of shared content.

18. The method of claim 9, further comprising receiving a location of the second client.

\* \* \* \* \*